United States Patent
Chen et al.

(10) Patent No.: US 10,932,286 B2
(45) Date of Patent: *Feb. 23, 2021

(54) PARALLEL LOW LATENCY AWARENESS

(71) Applicant: QUALCOMM Incorporated, San Diego, CA (US)

(72) Inventors: Wanshi Chen, San Diego, CA (US); Durga Prasad Malladi, San Diego, CA (US); Peter Gaal, San Diego, CA (US); Yongbin Wei, La Jolla, CA (US); Hao Xu, Beijing (CN); Shimman Arvind Patel, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/160,854

(22) Filed: Oct. 15, 2018

(65) Prior Publication Data

US 2019/0075580 A1 Mar. 7, 2019

Related U.S. Application Data

(63) Continuation of application No. 14/993,592, filed on Jan. 12, 2016, now Pat. No. 10,104,683.

(Continued)

(51) Int. Cl.
*H04W 72/12* (2009.01)
*H04L 5/00* (2006.01)

(52) U.S. Cl.
CPC ....... *H04W 72/1263* (2013.01); *H04L 5/0044* (2013.01); *H04L 5/0091* (2013.01); *H04W 72/1231* (2013.01)

(58) Field of Classification Search
CPC .................................. H04W 72/1263
See application file for complete search history.

(56) References Cited

U.S. PATENT DOCUMENTS

| | | | |
|---|---|---|---|
| 5,949,822 | A | 9/1999 | Hancharik |
| 6,347,120 | B1 | 2/2002 | Sakoda |

(Continued)

FOREIGN PATENT DOCUMENTS

| | | | |
|---|---|---|---|
| CN | 101141178 A | 3/2008 | |
| CN | 103096480 A | 5/2013 | |

(Continued)

OTHER PUBLICATIONS

Zhou Y., et al., "LTE Uplink Coverage Enhancement Techniques Based on Enhanced TTI Bundling", 2012 8th International Conference on Wireless Communications, Networking and Mobile Computing (WiCOM 2012), IEEE, DOI: 10.1109/WiCOM.2012.6478568, Mar. 14, 2013, 5 pgs.

(Continued)

*Primary Examiner* — Deepa Belur
(74) *Attorney, Agent, or Firm* — Holland & Hart LLP

(57) ABSTRACT

Methods, systems, and devices for wireless communication are described. A receiving device may detect a signal associated with low latency transmissions and decode a non-low latency communication accordingly. The receiving device may receive an indicator from a transmitting device that indicates where and when low latency communications occur. The indication may specify frequency resources or symbols used by the low latency communication. The indicator may be transmitted during the same subframe as the low latency communication, at the end of a subframe, or during a subsequent subframe. The receiving device may use the indicator to mitigate low latency interference, generate channel estimates, and reliably decode the non-low latency communication. In some cases, the interfering low latency (Continued)

communication may occur within the serving cell of the receiving device; or the interfering low latency communication may occur in a neighboring cell.

30 Claims, 16 Drawing Sheets

Related U.S. Application Data

(60) Provisional application No. 62/165,783, filed on May 22, 2015, provisional application No. 62/113,066, filed on Feb. 6, 2015.

(56) References Cited

U.S. PATENT DOCUMENTS

| | | | |
|---|---|---|---|
| 7,068,683 | B1 | 6/2006 | Lundby et al. |
| 7,184,485 | B2 | 2/2007 | Balakrishnan et al. |
| 8,295,227 | B2 | 10/2012 | Katayama et al. |
| 8,315,225 | B2 | 11/2012 | Xu et al. |
| 8,356,127 | B2 | 1/2013 | Hampel |
| 8,780,833 | B2 | 7/2014 | Kim et al. |
| 8,868,743 | B2 | 10/2014 | Park |
| 9,148,271 | B2 | 9/2015 | Wang et al. |
| 9,538,503 | B2 | 1/2017 | Papasakellariou et al. |
| 9,629,143 | B2 | 4/2017 | Jung et al. |
| 9,654,313 | B2 | 5/2017 | Davydov et al. |
| 9,831,958 | B2 | 11/2017 | Hwang et al. |
| 1,010,468 | A1 | 10/2018 | Chen et al. |
| 10,321,455 | B2* | 6/2019 | Kuchibhotla ..... H04W 72/0406 |
| 2011/0223948 | A1* | 9/2011 | Yamazaki ............ H04B 7/0671 455/500 |
| 2013/0170560 | A1 | 7/2013 | Yang et al. |
| 2014/0056244 | A1* | 2/2014 | Frenne ................. H04L 5/0053 370/329 |
| 2014/0071954 | A1 | 3/2014 | Au et al. |
| 2014/0226607 | A1 | 8/2014 | Holma et al. |
| 2014/0241308 | A1 | 8/2014 | Hoffmann et al. |
| 2014/0247804 | A1* | 9/2014 | Wermuth .............. H04W 72/02 370/330 |
| 2015/0063241 | A1* | 3/2015 | Shimezawa ......... H04W 72/042 370/329 |
| 2015/0201376 | A1* | 7/2015 | Webb ................ H04W 52/0238 370/311 |
| 2015/0334709 | A1 | 11/2015 | Ji et al. |
| 2016/0174238 | A1 | 6/2016 | Chen et al. |
| 2016/0227560 | A1 | 8/2016 | Webb et al. |
| 2016/0309470 | A1* | 10/2016 | Yi .................... H04W 72/0446 |
| 2017/0135116 | A1* | 5/2017 | Kuchibhotla ......... H04L 5/0055 |
| 2018/0219666 | A1* | 8/2018 | Lee ....................... H04L 5/0087 |

FOREIGN PATENT DOCUMENTS

| | | | | |
|---|---|---|---|---|
| CN | 103326804 A | | 9/2013 | |
| EP | 2779513 A2 | | 9/2014 | |
| EP | 2816858 A1 | | 12/2014 | |
| EP | 3448106 A1 * | | 2/2019 | ........ H04W 72/1247 |
| WO | WO-2002041509 | | 5/2002 | |
| WO | WO-2015179135 A1 | | 11/2015 | |
| WO | WO-2016093981 A1 | | 6/2016 | |

OTHER PUBLICATIONS

International Search Report and Written Opinion—PCT/US2016/013236—ISA/EPO—dated Apr. 6, 2016.

* cited by examiner

PARALLEL LOW LATENCY AWARENESS

CROSS REFERENCES

The present Application for Patent is a continuation of U.S. patent application Ser. No. 14/993,592 by Chen et al., entitled "Parallel Low Latency Awareness" filed Jan. 12, 2016, which claims priority to U.S. Provisional Patent Application No. 62/165,783, entitled "Parallel ULL Awareness," filed May 22, 2015 and U.S. Provisional Patent Application No. 62/113,066, entitled "Parallel ULL Awareness," filed Feb. 6, 2015, assigned to the assignee hereof, and expressly incorporated by reference herein.

BACKGROUND

The following relates generally to wireless communication and more specifically to parallel low latency awareness in wireless communications systems.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems.

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

A wireless communications system may utilize low latency operation to increase the throughput of a communication link. In some cases, low latency operation may occur concurrently with non-low latency operation. If a device receiving a non-low latency communication is unaware of the low latency communication, the low latency communication may interfere with the ability of the receiving device to decode all of the information in the non-low latency communication.

SUMMARY

Systems, methods, and apparatuses for parallel low latency (low latency) awareness are described. A receiving device may detect a signal associated with low latency transmissions and decode a non-low latency communication accordingly. In some cases, the receiving device may receive an indicator from a transmitting device that informs the receiving device where and when low latency communications are occurring. For instance, the indication may disclose the frequency resources that are utilized by the low latency communication and which symbols are being used. The indicator may be transmitted during the same subframe as the low latency communication, at the end of a subframe or during a subsequent subframe. The receiving device may use the indicator to mitigate low latency interference, generate channel estimates, and reliably decode the non-low latency communication. In some cases, the interfering low latency communication may occur within the serving cell of the receiving device; while in other cases, the interfering low latency communication may occur in a neighboring cell.

A method of wireless communications at a UE is described. The method may include receiving, within a first control region of a first TTI, control information for a non-low latency communication from a base station, the non-low latency communication associated with a downlink transmission in a first data region of the first TTI, receiving, within a second control region subsequent to the first control region, a low latency indicator from the base station, the low latency indicator associated with a low latency communication in the first data region of the first TTI, and determining a set of resources associated with the low latency communication that at least partially overlap resources of the downlink transmission based on the low latency indicator.

An apparatus for wireless communications at a UE is described. The apparatus may include a processor, memory in electronic communication with the processor, and instructions stored in the memory. The instructions may be executable by the processor to cause the apparatus to receive, within a first control region of a first TTI, control information for a non-low latency communication from a base station, the non-low latency communication associated with a downlink transmission in a first data region of the first TTI, receive, within a second control region subsequent to the first control region, a low latency indicator from the base station, the low latency indicator associated with a low latency communication in the first data region of the first TTI, and determine a set of resources associated with the low latency communication that at least partially overlap resources of the downlink transmission based on the low latency indicator.

Another apparatus for wireless communications at a UE is described. The apparatus may include means for receiving, within a first control region of a first TTI, control information for a non-low latency communication from a base station, the non-low latency communication associated with a downlink transmission in a first data region of the first TTI, receiving, within a second control region subsequent to the first control region, a low latency indicator from the base station, the low latency indicator associated with a low latency communication in the first data region of the first TTI, and determining a set of resources associated with the low latency communication that at least partially overlap resources of the downlink transmission based on the low latency indicator.

A non-transitory computer-readable medium storing code for wireless communications at a UE is described. The code may include instructions executable by a processor to receive, within a first control region of a first TTI, control information for a non-low latency communication from a base station, the non-low latency communication associated with a downlink transmission in a first data region of the first TTI, receive, within a second control region subsequent to the first control region, a low latency indicator from the base station, the low latency indicator associated with a low latency communication in the first data region of the first TTI, and determine a set of resources associated with the low latency communication that at least partially overlap resources of the downlink transmission based on the low latency indicator.

In some examples of the method, apparatuses, and non-transitory computer-readable medium described herein, the low latency indicator indicates a set of symbols allocated for the low latency communication.

Some examples of the method, apparatuses, and non-transitory computer-readable medium described herein may further include operations, features, means, or instructions for receiving, within a third control region subsequent to the second control region, a second low latency indicator associated with a second low latency communication from the base station, the second low latency indicator indicating a second set of symbols occurring before the third control region allocated for the second low latency communication.

In some examples of the method, apparatuses, and non-transitory computer-readable medium described herein, the second set of symbols includes one or more symbols of the set of symbols.

In some examples of the method, apparatuses, and non-transitory computer-readable medium described herein, the second set of symbols includes symbols only between the second control region and the third control region.

In some examples of the method, apparatuses, and non-transitory computer-readable medium described herein, the low latency indicator includes a bitmap corresponding to the set of symbols allocated for the low latency communication.

Some examples of the method, apparatuses, and non-transitory computer-readable medium described herein may further include operations, features, means, or instructions for decoding at least a portion of the downlink transmission in the first data region of the first TTI based on the set of resources associated with the low latency communication.

Some examples of the method, apparatuses, and non-transitory computer-readable medium described herein may further include operations, features, means, or instructions for refraining from decoding at least a portion of the downlink transmission in the first data region of the first TTI based on the set of resources associated with the low latency communication.

In some examples of the method, apparatuses, and non-transitory computer-readable medium described herein, refraining from decoding may include operations, features, means, or instructions for refraining from decoding all symbols of the downlink transmission in the first TTI that overlap or may be subsequent to a symbol allocated for the low latency communication.

In some examples of the method, apparatuses, and non-transitory computer-readable medium described herein, receiving the low latency indicator may include operations, features, means, or instructions for receiving the low latency indicator via a symbol associated with broadcast or multicast content.

In some examples of the method, apparatuses, and non-transitory computer-readable medium described herein, receiving the low latency indicator may include operations, features, means, or instructions for receiving the low latency indicator aligned with a boundary of a code block associated with unicast content for the UE.

Some examples of the method, apparatuses, and non-transitory computer-readable medium described herein may further include operations, features, means, or instructions for decoding the code block based on the low latency indicator.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
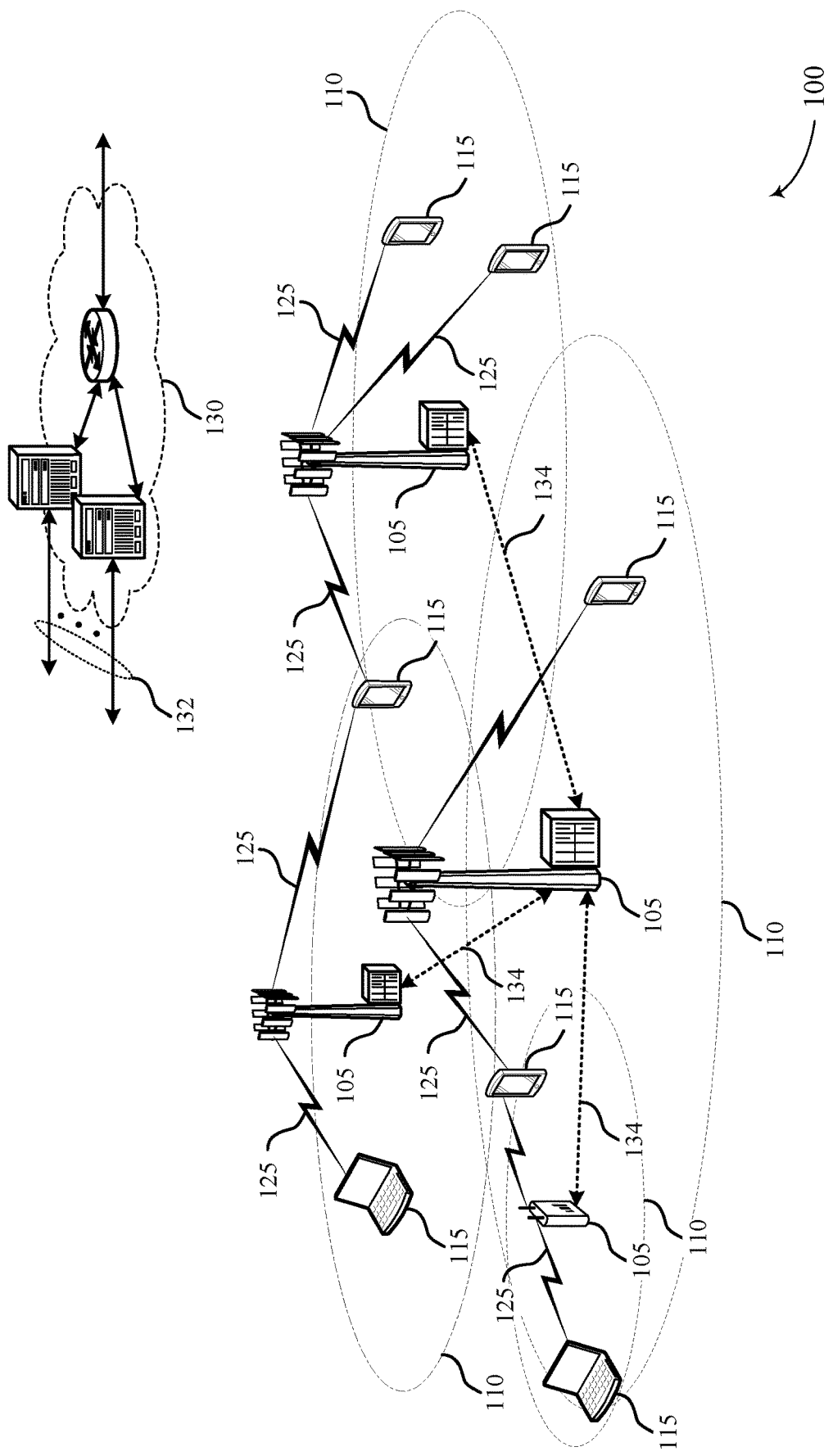
FIG. 1 illustrates an example of a wireless communications system that supports parallel low latency awareness in accordance with various aspects of the present disclosure.

A wireless system may utilize low latency communications to increase the throughput of a communication link and to support latency-intolerant communications. Low latency communications may utilize transmission time intervals (TTIs) that are significantly shorter than 1 ms, thereby considerably reducing latency and increasing scheduling flexibility. A wireless system that utilizes both low latency and non-low latency communications may experience low latency interference during non-low latency operations. Therefore, a receiving device may detect an indication of low latency interference to mitigate potentially deleterious effects associated with low latency communications. Since a non-low latency transmission may, for example, be scheduled at the beginning of a 1 ms subframe, while low latency traffic may be scheduled on a per symbol basis, the receiving device may wait until the end of the subframe before decoding the received data. An indication of low latency traffic may be included in the end (e.g., in the last several symbols) of a subframe, in a control region of a subsequent subframe (e.g., in the first several symbols of a subsequent subframe), in the middle of a subframe (e.g., near a slot boundary), and the like. The receiving device may additionally utilize the indication of low latency interference for symbol and block dependent interference estimation.

A wireless system may employ a dual TTI structure on one or more carriers (e.g., time division duplexing (TDD) or frequency division duplexing (FDD) carriers). Symbol length TTIs (or other sub-subframe TTIs) may be referred to as low latency TTIs and may be organized within particular subframes of TDD frame. These subframes may be referred to as low latency subframes, they may be scheduled at the subframe level for transmissions in one direction (e.g., uplink (UL) or downlink (DL)), and they may include multiple low latency symbols scheduled for both UL and DL transmissions. Because low latency subframes may contain both DL and UL low latency symbols, transmission, and reception by the same device is possible within either a DL or UL subframe. Moreover, because the numerology of such low latency symbols may be consistent with numerology for non-low latency system operation, low latency-capable devices can utilize the low latency symbols while non-low latency devices can readily ignore the symbols. As described herein, a system may leverage LTE numerology (e.g., timing, TTI structure, etc.) to minimize implementation effort and foster backwards compatibility. For instance, in certain systems supporting low latency may include a 15 kHz tone spacing and a cyclic prefix (CP) duration of roughly 71 μs. This approach may thus provide for integration of both low latency devices and non-low latency or legacy devices (e.g., devices operating according to earlier versions of an LTE standard).

As mentioned above, and as further described herein, a low latency TTI structure may significantly reduce latency in a wireless system and increase scheduling flexibility. For example, as compared to an LTE system without a low latency TTI structure, latency may be reduced from approximately 4 ms to approximately 300 μs. This represents more than an order of magnitude reduction in latency. Because a TTI for each low latency period may be a single symbol period, a potential latency reduction of 12× or 14× (for extended CP and normal CP, respectively) may be realized.

In some cases, systems that support low latency transmission can accommodate up to eight (8) hybrid automatic repeat request (HARQ) processes. In other cases, more than eight (8) HARQ processes may be supported. However, in a system utilizing both non-low latency and low latency communications, low latency operations may also introduce interference to non-low latency communications. In some cases, a low latency transmission utilizes resources that have been assigned to or interfere with a non-low latency communication. For instance, on the uplink, resources assigned to a low latency transmission may overlap with resource blocks (RBs) assigned to a non-low latency UL transmission. A low latency DL transmission may puncture or occupy resource blocks assigned to a non-low latency DL transmission, for example. In some cases, because control information associated with non-low latency communication is transmitted before a low latency transmission, the control information may not include sufficient information to decode all of the information in the non-low latency communication.

In order to mitigate interference from low latency and non-low latency coexistence, and to facilitate decoding of data, a device may detect low latency operation within the system. In some cases, a low latency-aware device may use blind detection to detect low latency operation. In other cases, a low latency-aware device may receive a signal alerting the device to the presence of low latency in some symbols or RBs. For instance, a low latency indicator may be sent to a device that may specify where low latency operation is enabled for a serving cell. The low latency indicator may also indicate whether low latency operation is enabled in a neighboring cell. This indication may be signaled semi-statically or dynamically and may occur in the uplink or downlink, and it may be included with a data region of the subframe or in a subsequent subframe, or both.

The low latency indicator may have granularity in both the frequency or time domain. For instance, the frequency domain may include resource blocks under which low latency operation may be performed. Each block may be about 5 MHz, for example. As another example, each block may be a resource block. In the time domain, symbol level indication may be used to identify low latency operation in a subframe. In some examples, backhaul links may be used to exchange low latency indicators between base stations, and inter-cell coordination may minimize the impact of low latency operation. For instance, broadcast information may be transmitted using resources that do not coincide with the low latency transmission.

In some cases, a 1 ms physical downlink shared channel (PDSCH) transmission (e.g., a non-low latency transmission) may be scheduled at the beginning of a subframe, while low latency traffic may be scheduled on a per symbol basis (e.g., during a subframe). Therefore, a low latency indicator may be signaled at the end of the subframe or in a subsequent subframe to accommodate all low latency traffic that may occur during the 1 ms transmission. Consequently, a receiving device may wait until the end of the 1 ms subframe before attempting to decode a received PDSCH transmission. Additionally or alternatively, one or more low latency indicators may be signaled in the middle of the subframe (e.g., in a data region of the subframe) to accommodate low latency traffic that may occur before the respective indicator. Consequently, a receiving device may attempt to decode a part of a received PDSCH transmission before each respective low latency indicator. In some cases, a low latency-aware device may decode multiple sets of control information before decoding a PDSCH transmission. The presence of such control information, which may include one or more additional control channels in the data region of a subframe, may be used by a low latency-aware device to facilitate early (e.g., faster) decoding of a PDSCH transmission.

By way of example, a low latency-aware device may decode a first set of control information that is associated with the scheduled PDSCH and one or more additional sets of control information that provide information about certain symbols or RBs that have been scheduled for low latency operation (e.g., a low latency operation may have been scheduled following the PDSCH scheduling.) In some cases, the first set of control information may be omitted—e.g., when semi-persistent scheduling (SPS) is used to schedule the PDSCH to a device. Semi-static signaling for low latency operation may also be utilized to signal to a device that low latency operation may exist in specific RBs in a subframe. In some examples, the first control channel may be a physical downlink control channel (PDCCH) or an enhanced PDCCH (EPDCCH), while a second control channel may be a PDCCH or a similar UE-specific channel; as discussed below, a broadcast or multicast channel may also be employed to provide a low latency indication. The PDSCH may be rate matched around the resource elements (REs) used by low latency operation or may be punctured by REs used by low latency transmission. A receiving device may update channel estimates accordingly to increase decoding probability.

In other cases, a low latency-aware device may use the low latency indicator for at least one of symbol or block dependent interference estimation. For instance, a low latency-aware device may indicate that null tones are inserted into determined symbols and blocks based on a low latency indicator to improve interference estimation. The indication may be signaled semi-statically or dynamically. The indication of low latency operations in neighboring cells may be signaled in the middle of subframe, at the end of a subframe, or in a subsequent subframe, or in all three, for example. Therefore, the device may decode multiple sets of control information to facilitate, and prior to, PDSCH decoding. The device may, in some instances, decode the first set of control information that schedules the PDSCH and a second set of control information providing information about certain symbols or RBs using low latency operation in neighboring cells or the use of null tones in symbols or resource blocks (RBs) on the PDSCH to improve enhanced PDCCH or PDSCH demodulation. Semi-static signaling may be used to indicate to a device that low latency operation is present in pre-determined symbols or RBs for a subframe. A device may use this information to update interference estimates accordingly.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 that supports parallel low latency awareness in accordance with various aspects of the present disclosure. The wireless communications system 100 includes base stations 105, user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links. In some cases, base stations 105 may communication with one another indications associated with low latency scheduling.

The base stations 105 may wirelessly communicate with the UEs 115 via one or more base station antennas. Some base stations 105 may communication with UEs 115 utilizing low latency transmissions. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier, or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100 and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, and the like. Some of the UEs 115 may support low latency transmission, some UEs 115 may support low latency awareness, and some UEs 115 may support both.

The communication links 125 shown in wireless communications system 100 may include UL transmissions from a UE 115 to a base station 105, or DL transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described herein. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). In some cases, the communication links 125 include low latency transmissions between base stations 105 and UEs 115.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The system 100 may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, or 16 sub-bands.

Data may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, dedicated traffic channel (DTCH) for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and uplink shared channel (UL-SCH) for data. DL physical channels may include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data.

PDCCH may carry downlink control information (DCI) in control channel elements (CCEs), which may consist of nine logically contiguous resource element groups (REGs), where each REG contains 4 resource elements (REs). DCI may include information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell radio network temporary identity (C-RNTI) and CRC bits attached to each DCI may be scrambled based on the C-RNTI. To reduce power consumption and overhead at the user equipment, a limited set of control channel element (CCE) locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures, and the like. The UE-specific search space may include user-specific control information. A UE 115 may attempt to decode DCI by performing a process known as a blind decode, during which search spaces are randomly decoded until the DCI is detected.

HARQ may be a method of ensuring that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). Non-low latency HARQ may include a delay of 4 ms between each step of a HARQ process (e.g., transmission, feedback, retransmission), whereas low latency operation may enable a reduced latency of 4 symbol periods (approximately 300 μs).

A frame structure may be used to organize physical resources. A frame may be a 10 ms interval that may be further divided into 10 equally sized sub-frames. Each sub-frame may include two consecutive time slots. Each slot may include 6 or 7 OFDMA symbol periods. A resource element consists of one symbol period and one subcarrier (e.g., a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell-specific reference signals (CRS) and a UE-specific RS (UE-RS). UE-RS may be transmitted on the resource blocks associated with PDSCH. The number of bits carried by each resource element may depend on the modulation scheme (the configuration of symbols that may be selected during each symbol period). Thus, the more resource blocks that a UE receives and the higher the modulation scheme, the higher the data rate may be for the UE.

Time intervals in LTE may be expressed in multiples of a basic time unit (e.g., the sampling period, $T_s=1/30,720,000$ seconds). Time resources may be organized according to radio frames of length of 10 ms ($T_f=307200 \cdot T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs). For example, some TTIs may have a duration of one or a few symbol periods.

In some cases, the wireless communication system 100 may use 1 ms transmit time intervals (TTIs) (i.e., a subframe) for sending and receiving data during a non-low latency communication. A set of resource may be allocated to a transmitting base station 105 or UE 115 for a TTI. During this time a transmission from the transmitting device may occupy those resources. At the beginning of the TTI, the base station 105 may include a grant that contains control information (e.g., channel estimates, interference estimates, MCS, resource allocation, etc.) indicating which resources have been assigned to a receiving device during that TTI. The receiving device may then use the control information to find and decode the correct resources. In some cases, a low latency communication may use TTIs that are significantly shorter than 1 ms (e.g., 71 or 83 μs). These shorter TTIs may allow for greater scheduling flexibility.

UEs 115 within a system that uses both low latency operation and non-low latency communication may experience performance degradation. Since a low latency transmission utilizes short TTIs, the transmission may be scheduled during an ongoing non-low latency TTI. In some cases, the low latency transmission may be allocated resources that interfere with or have already been scheduled to a non-low latency transmission. In one example, a base station 105 may transmit a non-low latency transmission to a first UE 115. The base station 105 may subsequently schedule a low latency transmission to a second UE 115 during the non-low latency transmission. In some cases, the low latency transmission may puncture the resources allocated to the non-low latency transmission, which may tend to cause interference for the first UE 115. For example, if the first UE 115 attempts to decode the non-low latency transmission based on the grant received at the beginning of the non-low latency TTI without compensating for the interfering low latency transmission. This may result in decoding failures because the first UE 115 is unable to mitigate the interference associated with the low latency transmission. Therefore, the wireless communication system 100 may thus employ techniques that enable a device to detect a signal associated with low latency interference and update the original control information accordingly.

In some examples, a UE 115 may detect a signal associated with low latency interference and decode a non-low latency communication accordingly. In some cases, the UE 115 may receive an indicator from a base station 105 that informs the UE 115 where and when low latency communications are occurring. For instance, the indication may disclose the frequency resources that are utilized by a low latency communication and which symbols are being used. The indicator may be transmitted at the end of a subframe or during a subsequent subframe. The UE 115 may use the indicator to mitigate low latency interference and to reliably decode the non-low latency communication. In some cases, the interfering low latency communication may occur within the serving cell of the UE 115; while in other cases, the interfering low latency communication may occur in a neighboring cell.

Figure 2A:
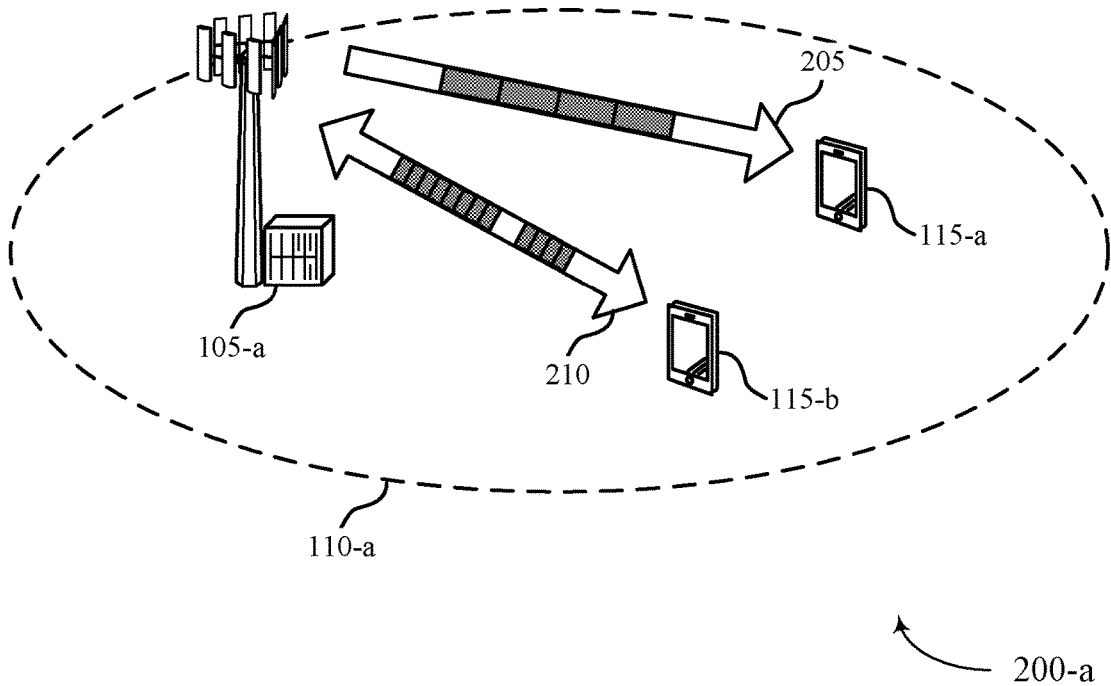
FIGS. 2A and 2B illustrate examples of wireless communications systems that support parallel low latency awareness in accordance with various aspects of the present disclosure.

FIG. 2A illustrates an example of a wireless communication system 200-*a* that supports parallel low latency awareness in accordance with various aspects of the present disclosure. Wireless communication system 200-*a* may include UE 115-*a*, UE 115-*b*, and base station 105-*a*, which may be examples of a UE 115 or a base station 105 described with reference to FIG. 1. Base station 105-*a* may communicate with UE 115-*a* or UE 115-*b* when the devices are within coverage area 110-*a*, as generally described with reference to FIG. 1. A non-low latency communication 205 may use 1 ms transmit time intervals, while a low latency communication 210 may use shorter TTIs (e.g., 71 µs or 83 µs).

A low latency-aware receiving device may receive a non-low latency communication while a neighbor device may participate in a low latency communication. In some cases, the low latency communication may interfere with the non-low latency communication. The serving cell of the neighbor device (which may also be the serving cell of the receiving device) may determine that a low latency communication is active and may generate an indicator to include in a subsequent control message. The serving cell may send the indicator alerting the receiving device to the presence of the low latency communication. In some cases, the serving cell may update a rate matching scheme for the non-low latency communication to accommodate the low latency communication (i.e., if the low latency resources puncture the resources scheduled for non-low latency communication). In some cases, the serving cell may also generate null tones for interference estimation. The receiving device may then decode the non-low latency communication according to the received indicator.

For example, base station 105-*a* may schedule UE 115-*a* for a non-low latency communication 205. Base station 105-*a* may then prepare a transmission and transmit a downlink grant and data to UE 115-*a*. In some cases, transmissions are scheduled on a per TTI basis and may extend through a non-low latency TTI. Base station 105-*a* or UE 115-*b* may subsequently schedule low latency communication 210 during the transmission (e.g., the low latency communication may not be scheduled until the middle of the subframe when it will occur). In some cases, low latency communication 210 may use resources that overlap or neighbor with the resources scheduled for non-low latency communication 205. Therefore, low latency communication 210 may affect the transmission (e.g., interference with or puncturing of resources) to UE 115-*b*.

Thus, base station 105-*a* may determine what resources are being used by low latency communication 210. Base station 105-*a* may then generate a low latency indicator including control information to indicate the presence of the low latency communication. Base station 105-*a* may include the low latency indicator with a subsequent downlink grant associated with a subsequent non-low latency transmission to UE 115-*a*. For example, the indicator may be included as part of a PDCCH transmitted in the first symbol period of the next subframe. In another example, the indicator may be sent during the same subframe as the low latency communication. In some cases, the indicator may be sent in symbols that include broadcast-type or multicast-type content. The indicator may include granularity in the frequency or time domain (i.e., it may indicate that certain RBs may be used for low latency communication) and may convey frequency blocks or symbols that were used for low latency operation. In some examples, the indicator may be or include a bitmap, which may indicate whether low latency transmissions have been scheduled in prior symbols of a subframe. For instance, low latency resources may be allocated in blocks, which may include 25 RBs, so four (4) blocks may include 100 RBs. In such cases, 14 bits per block (e.g., 56 payload bits in the case of four (4) blocks) may be included in the bitmap to indicate a presence of low latency-transmissions. In other examples, control channels may be aligned with code block boundaries of unicast traffic. Such alignment may facilitate early decoding of PDSCH, which may be performed on a per-code block basis. Other configurations may, for example, include indicators transmitted on a per-layer basis. The indicator may be configured semi-statically (e.g., low latency operation occurs during pre-determined subframes) or it may be transmitted dynamically.

In some cases, base station 105-*b* may transmit null tones to UE 115-*c*. The null tones may be transmitted based on a low latency transmission and may be used for interference estimation by UE 115-*c*. In some cases, the null tones may be used in frequency or time resources allocated to predetermined low latency transmissions. Additionally or alternatively, the null tones may be dynamically used based on unexpected low latency transmissions. For example, base station 105-*a* may include null tones in a non-low latency communication 205. In some cases, base station 105-*a* may semi-statically configure null tones, while in other cases null tones may be dynamically configured based on low latency transmissions.

At the end of the non-low latency transmission punctured or interfered with by a low latency transmission, UE 115-*a* may wait to decode the non-low latency transmission until it has received the low latency indicator. After receiving a subsequent downlink grant and low latency indicator, UE 115-*a* may decode the previously received data according to the received indicator. For example, UE 115-*a* may update channel estimates, mitigate the low latency interference or refrain from decoding symbols that have been allocated to a low latency transmission.

Figure 2B:
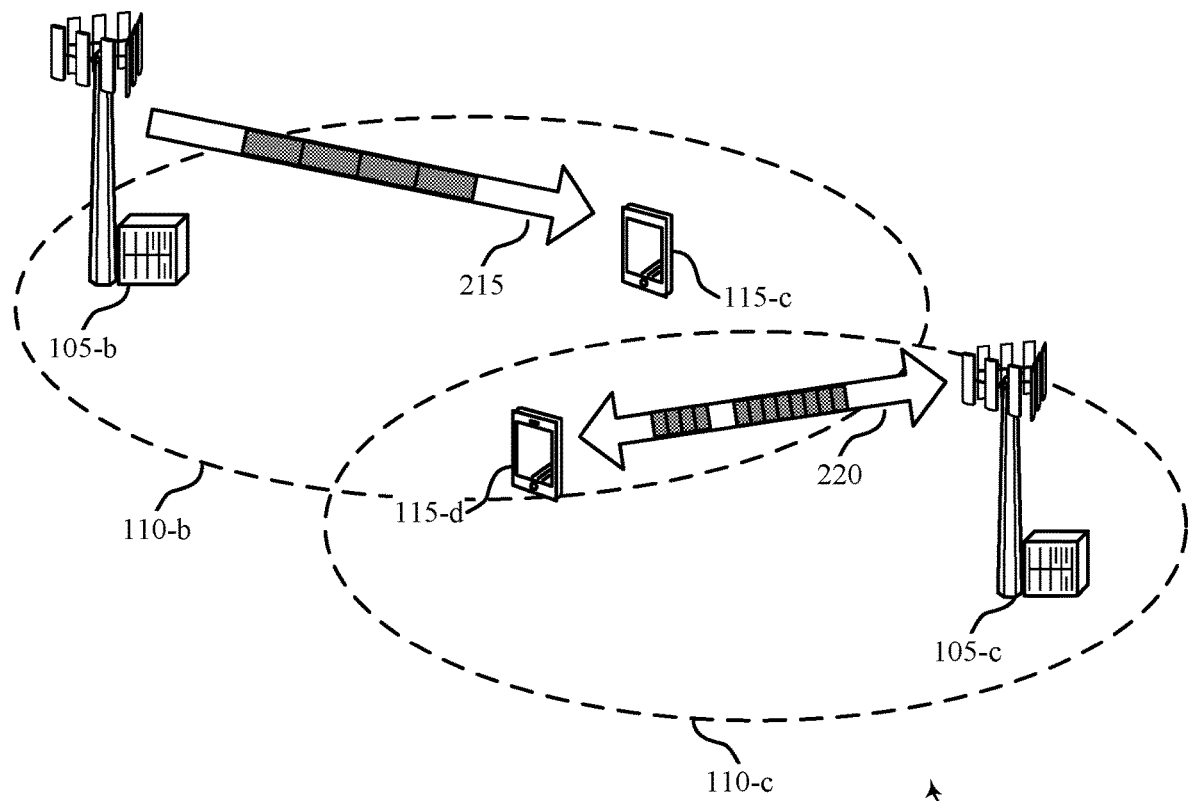

FIG. 2B illustrates an example of a wireless communication system 200-*b* for parallel low latency awareness in accordance with various aspects of the present disclosure. Wireless communication system 200-*b* may include UE 115-*c*, UE 115-*d*, base station 105-*b*, and base station 105-*c*, which may be examples of a UE 115 or a base station 105 described with reference to FIG. 1. Base station 105-*b* and base station 105-*c* may communicate with UE 115-*c* or UE 115-*d* when the devices are within respective coverage area 110-*b* or coverage area 110-*c*, as described with reference to FIG. 1. A non-low latency communication 215 may use 1 ms TTIs, for example, while a low latency communication 220 may use shorter TTIs (e.g., 71 µs, 83 µs, etc.).

A low latency-aware receiving device may receive a non-low latency communication while neighboring devices may participate in a low latency communication. In some cases, the neighboring low latency communication may interfere with the non-low latency communication. The serving cell or the neighboring cell (or, in some cases the neighboring device) may determine that a low latency communication is active and may generate an indicator. One of the serving cell, the neighboring cell, or the neighboring device may transmit the indicator to alert the receiving device to the presence of the low latency communication. For example, a serving cell may receive an indication from a neighbor cell that low latency communication is scheduled and transmit this information to the low latency-aware receiving device (e.g., via broadcast or unicast transmission). In some cases, the serving device may generate null tones for interference estimation. The low latency-aware receiving device may then decode the non-low latency communication according to the received indicator.

In some examples, base station 105-*b* may schedule UE 115-*c* for a non-low latency communication 215. Base station 105-*b* may then prepare a transmission and transmit a downlink grant and data to UE 115-*c*. In some cases, transmissions are scheduled on a per TTI basis and may extend through a non-low latency TTI. Base station 105-*c* or UE 115-*d* may subsequently schedule a low latency communication 220 during the transmission. The low latency communication 220 may use resources that overlap or neighbor with the resources scheduled for non-low latency communication 215. Therefore, the low latency communication 220 may interfere with the transmission to UE 115-*c* if UE 115-*c* is unaware of the low latency transmission.

Base station 105-*c* or UE 115-*d* may determine what resources are being used by low latency communication 210, and generate a low latency indicator to indicate the presence of the low latency communication to UE 115-*c*. Base station 105-*b* or base station 105-*c* may then broadcast or unicast the indicator to UE 115-*c*. In some cases, base station 105-*c* may send the indicator to base station 105-*b* through a backhaul link (not shown). Thus, although both wireless communication system 200-*a* and wireless communication system 200-*b* illustrate examples in which a UE 115 receives a low latency indicator from a base station 105, in some examples a base station 105 may also receive a low latency from a neighbor base station 105 via backhaul link to coordinate interference mitigation operations. Base station 105-*b* may then include the low latency indicator with a subsequent downlink grant associated with a subsequent non-low latency transmission to UE 115-*c*. In some cases, however, a neighboring base station 105 may directly transmit an indication, which may be particularly useful if the indication is for handling symbol or block-dependent low latency interference from neighboring cells because backhaul information can be minimized. The indicator may include granularity in the frequency or time domain and may communicate frequency blocks or symbols that were used for low latency operation. The indicator may be transmitted semi-statically—e.g., low latency operation occurs during pre-determined subframes, uses pre-determined resources, etc.—or it may be transmitted dynamically.

From the perspective of UE 115-*c*, the reception of the indication can be made transparent or non-transparent with respect to whether a serving or neighbor base station 105 is providing the indication. For transparent operation, UE 115-*c* simply decodes the control channel assuming it is from the serving cell even if it is transmitted by the neighboring cell. For non-transparent operation, a signal may be provided to UE 115-*c* that the indication has some parameters associated with the neighboring base station 105 (e.g., cell ID for scrambling) so that UE 115 can decode the control channel that includes the indication accordingly.

UE 115-*c* may receive the low latency indicator during the non-low latency transmission and may decode the received data according to the received indictor. For example, UE 115-*b* may update channel estimate or mitigate the low latency interference.

Figure 3:
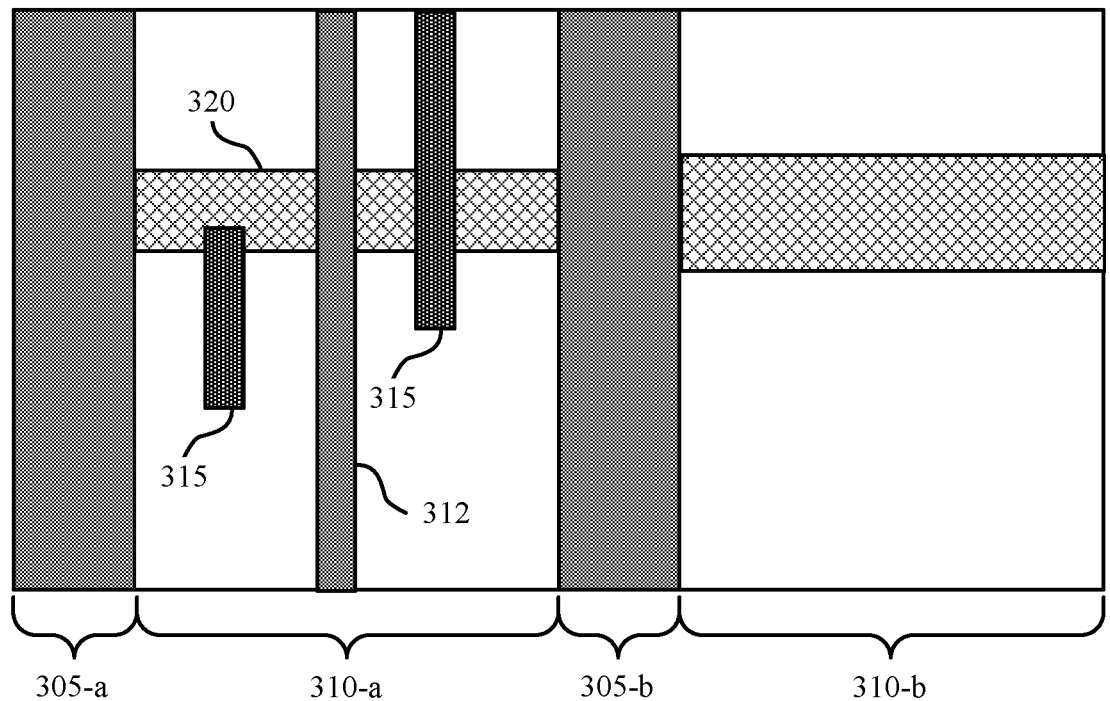
FIG. 3 illustrates an example of a channel structure that supports parallel low latency awareness in accordance with various aspects of the present disclosure.

FIG. 3 illustrates an example of a channel structure 300 for parallel low latency awareness in accordance with various aspects of the present disclosure. Channel structure 300 may illustrate aspects of a transmission between UEs 115 and base stations 105, as described with reference to FIGS. 1-2. Channel structure 300 may include a first control region 305, a subsequent control region 305-*b*, a first data region 310-*a*, a subsequent data region 310-*b*, and a control channel 312. The first control region 305-*a* and the first data region 310-*b* may, for example, make up one non-low latency TTI, and the second control region 305-*b* and the second data region 310-*b* may make up second non-low latency TTI. In some cases, the non-low latency TTIs are subframes that include two slots of 0.5 ms. The first control region 305-*a* and first data region 310-*a*, and subsequent control region 305-*b* and subsequent data region 310-*b* may extend through one non-low latency TTI. Low latency transmissions 315 may be transmitted during the UL TTI and may interfere with the PDSCH 320.

A base station 105 may schedule a communication to a UE 115. Base station 105 may then transmit control information, in the first control region 305, that the UE 115 may utilize for decoding PDSCH 320. The UE 115, however, may wait to decode the PDSCH until the end of first data region 310-*a* or subsequent control region 305-*b*. The base station 105 may schedule and transmit low latency transmissions 315, within the first data region (i.e., within a non-low latency TTI or subframe), that may overlap with or neighbor the PDSCH 320. These low latency transmissions 315 may puncture the PDSCH 320 in a manner that was not indicated by the control information sent in the first control region 305, which may introduce interference to a UE 115 attempting to decode the PDSCH 320. The base station 105 may therefore include a low latency indicator at some point after the low latency transmission 315—e.g., the low latency indicator may be immediately after the low latency transmission 315, within the first data region 310-*a*, at the end of first data region 310-*a*, or in the subsequent control region 305-*b*. In some examples, a control channel 312 at the beginning of slot 1, within the first data region 310-*a* may indicate a low latency transmission 315 in slot 0, while the second data region 310-*b*, which may be at the beginning of the next subframe, may indicate a low latency transmission 315 in slot 1. The control regions 305-*a* and 305-*b* and control channel 312 may be PDCCH, a low latency PDCCH (uPDCCH), or other control channels. For instance, control channel 312 may represent broadcast-type or multicast-type information that includes an indication of low latency transmission, such as a bitmap as described above. The UE may receive the indicator and use it to supplement the first set of received control information. The UE 115 may then decode the preceding PDSCH 320 accordingly.

The control channel 312 may be placed in other symbols of a subframe to indicate low latency transmissions 315 that occur before the symbol occupied by the control channel 312. This location or placing of the control channel 312 (and indicator) may be referred to herein as the "middle" of a subframe, and may or may not be at the beginning of slot 1 or the end of slot 0. The location of control channel 312 in the middle of a subframe (e.g., within the first data region 310-*a*), may be beneficial for various scheduling and decoding schemes, including PDCCH-scheduled, CRS-based PDSCH. A UE 115 may thus monitor an additional PDCCH, such as control channel 312, to determine whether low latency-transmissions are present within data region 310-*a*; alternatively, UE 115 could ignore control channel 312 (e.g., if UE 115 is not a low latency-aware device).

In some examples, multiple control channels may be utilized to indicate a presence of low latency transmissions 315. For instance, an indicator may be included in both control region 305-*b* and control channel 312. Such multi-channel indications may be used to convey various types of information to a UE 115. In one example, control channel 312 may include an indication of low latency transmissions 315 within symbols that are prior in time to control channel 312, while control region 305-*b* may include an indication of low latency transmissions 315 within symbols between control channel 312 and control region 305-*b*. Such an approach may be particularly useful if, e.g., an indicator is UE-specific. In another example, control channel 312 may include an indicator for low latency transmissions in preceding symbols, and control region 305-*b* may likewise include an indicator for low latency transmissions in preceding symbols, including those that precede control channel 312. Such indications in control region 305-*b* of preceding symbols may be particularly useful, e.g., for certain UEs 115 that do not decode control channel 312 (e.g., if control channel 312 includes broadcast-type information for which UE 115 is not able or configured to decode).

In some cases, an indicator in control channel 312 may be employed to cancel a PDSCH transmission for some or all symbols of a subframe (e.g., within first data region 310-*a*). That is, a UE 115 may receive an indicator in control channel 312 and may cancel scheduled transmissions based on the indictor. An indicator in control channel 312 may cancel transmissions within individual symbols, sets of symbols, for a subframe, for sets of subframes, or the like. For example, a UE 115 scheduled for PDSCH 320 may detect control channel 312 in symbol 5 of slot 0 or a subframe, and the symbol 5 PDSCH transmission may be canceled, while the PDSCH transmission for remaining symbols may be valid. In other cases, a UE 115 scheduled for PDSCH 320 may detect control channel 312, which may indicate that the PDSCH transmission is canceled for a number of symbols (e.g., all symbols following control channel 312 within data region 310-*a*).

Additionally or alternatively, control channel 312 may be employed to alter a resource allocation for one or more symbols of, e.g., data region 310-*a*. This may include altering a resource allocation following a cancellation of previously scheduled transmission. For instance, PDSCH 320 may include 5 RBs, control channel 312 may preempt or cancel PDSCH transmissions for symbol 5, and control channel 312 (or an additional control channel within data region 310-*a*) may reallocate (e.g., schedule) resources in symbol 6 such that a PDSCH transmission includes 10 RBs. That is, control channel 312 may cancel prior scheduled transmissions to accommodate low latency traffic, and control channel 312 or an additional control channel may change or alter a resource allocation to mitigate effects of resources lost by the cancelation. In some cases, the altering or changing of resource allocation may be by way of a supplemental grant in control channel 312. In some cases, control channel 312 may alter or allocate resources without first canceling a transmission.

In some examples, PDSCH 320 may be based on a bundling of low latency transmissions 315, which may be indicated in one or several control regions 305 or control channels 312. A UE 115 may be scheduled a transport block (TB) starting with a low latency transmission TTI (e.g., low latency transmission 315), and the TB may be repeated one or more times during a subframe (e.g., data region 310-*a*). In some examples, each symbol of a subframe (or a data region 310 of a subframe) may be utilized for low latency transmissions 315. Such bundling may effectively be utilized as a legacy transmission (e.g., 1 ms transmission). As mentioned, a UE 115 may monitor a control region 305 or control channel 312 for an indication of whether a TB is repeated. Such repetition of TBs may be employed to provide additional systematic bits or redundancy bits, or both, or to provide simple repetition of code blocks transmitted within a subframe. For instance, for a two code-block transmission, half of the resources of a symbol may be allocated for one of the code blocks and the other half of the resources may be allocated to the other. Then, this configuration may be repeated for each symbol of a subframe. That is, unlike a scenario in which one code block is allocated to a first group of symbols within a subframe and the second code block is allocated to a second group of symbols in a subframe, the bundling of low latency transmissions 315 herein may facilitate a symbol-level code block redundancy.

Low latency transmissions 315 may be transmitted by a UE 115 or base station 105 located in the same serving cell as the scheduled PDSCH 320. In this case, the serving base station 105 may transmit the indicator at the end of first data region 310-*a* or during subsequent control region 305-*b* or in control channel 312. In other cases, the low latency transmissions 315 are transmitted by a UE 115 or base station 105 in a neighboring cell. In this case, the neighboring base station 105 may transmit a broadcast message indicating low latency operation (or send a backhaul indication to the serving cell). Alternatively or additionally, the neighboring base station 105 may send the indicator to the serving cell via backhaul and the serving base station 105 may transmit the indicator at the end of first data region 310-*a* or during the subsequent control region 305-*b*. In other cases, two or more UEs 115 may utilize the above control techniques during device to device communication.

Figure 4A:
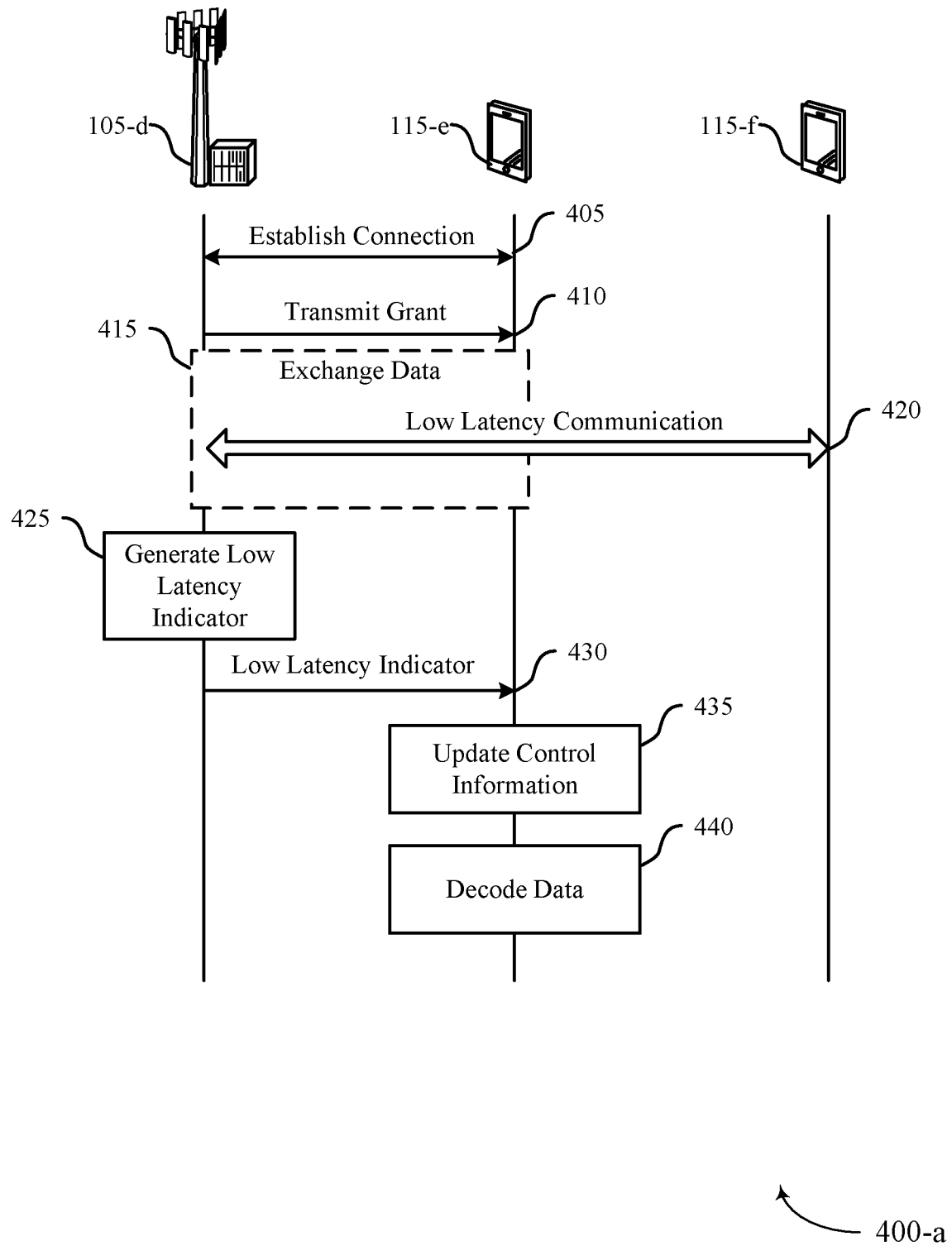
FIGS. 4A and 4B illustrate examples of process flows within a system or systems that support parallel low latency awareness in accordance with various aspects of the present disclosure.

FIG. 4A illustrates an example of a process flow 400-*a* for parallel low latency awareness in accordance with various aspects of the present disclosure. Process flow 400-*a* may include UE 115-*e*, UE 115-*f*, and base station 105-*d*, which may be examples of a UE 115 or base station 105 described with reference to FIGS. 1-2. In some examples, base station 105-*d*, UE 115-*e*, UE 115-*f* may utilize low latency indicators to facilitate the decoding of data.

At step 405, base station 105-*d* may establish a connection with UE 115-*e* and UE 115-*f* (not necessarily at the same time). UE 115-*e* and UE 115-*f* may be located in a cell supported by base station 105-*d*.

At step 410, base station 105-*d* may use a control channel to transmit a grant to UE 115-*e*. The grant may include control information that may be used to decode the corresponding data. In some cases, the grant may be sent at the beginning of a first TTI. In some cases, UE 115-*e* may receive the control channel during a first symbol period of the first TTI. The control channel may include scheduling information for the first TTI and decoding the first TTI may be based on the control channel. In some cases, the first TTI may be a non-low latency TTI (e.g., a 1 ms LTE subframe).

At step 415, the base station 105-*d* and UE 115-*e* may exchange data over a data channel based on the transmit grant. UE 115-*e* may receive the data channel during a first TTI utilizing resources in a data region. In some cases, The UE 115-*e* may refrain from decoding the exchanged data until a subsequent first TTI.

At step 420, a low latency communication may occur between base station 105-*d* and UE 115-*f*. The low latency communication may utilize a second TTI that extends through an LTE symbol period (e.g., 71 μs or 83 μs for an extended cyclic prefix). These shorter TTI intervals may allow base station 105-*d* to schedule urgent transmissions or data with reduced latency. In some examples, the portion includes a frequency range that is less than a frequency range used for receiving the data channel. In some examples, the portion includes a number of resource elements (REs) or resource blocks (RBs). Additionally or alternatively, the portion may include one or more low latency transmissions each having a duration of the second, shorter TTI. These mappings may use resources that overlap with or interfere with the resources being used by UE 115-*e* and base station 105-*d* to exchange data. In some cases, UE 115-*e* may be unaware of the low latency communication and the control information received in the original grant may not have taken the low latency communication into account.

At step 425, base station 105-*d* may generate a low latency indicator based on determining that a low latency communication has occurred. The low latency indicator may include information associated with the low latency communication, such as resource allocation information. In some cases, the indication may be received subsequent to the second TTI. In other cases, the indication may be received subsequent to the first TTI.

At step 430, UE 115-*e* may receive an indication that a low latency transmission may be present in a portion of the data region within the first TTI, where the low latency transmission may be based on a second TTI. In some cases, the low latency indicator may be included as additional control information with a subsequent grant. In some cases, the indication is a semi-static configuration.

At step 435, UE 115-*e* may update the control information received in the first grant based on the low latency indicator. In some cases, UE 115-*e* may generate a channel estimate based on the indication, where decoding the first TTI may be based on the channel estimate. In some cases, base station 105-*d* or UE 115-*f* may map a set of modulation symbols of the data channel into a set of resources including the portion of the data region within the first TTI. In other cases, base station 105-*d* or UE 115-*f* may map a set of modulation symbols of the data channel into a set of resources excluding the portion of the data region within the first TTI. For example, base station 105-*d* may determine a mapping of symbols to REs during each symbol period, and UE 115-*e* may identify the map based on the initial control channel and the low latency indication.

At step 440, UE 115-*e* may decode the exchanged data based on the received low latency indicator and the updated control information.

Figure 4B:
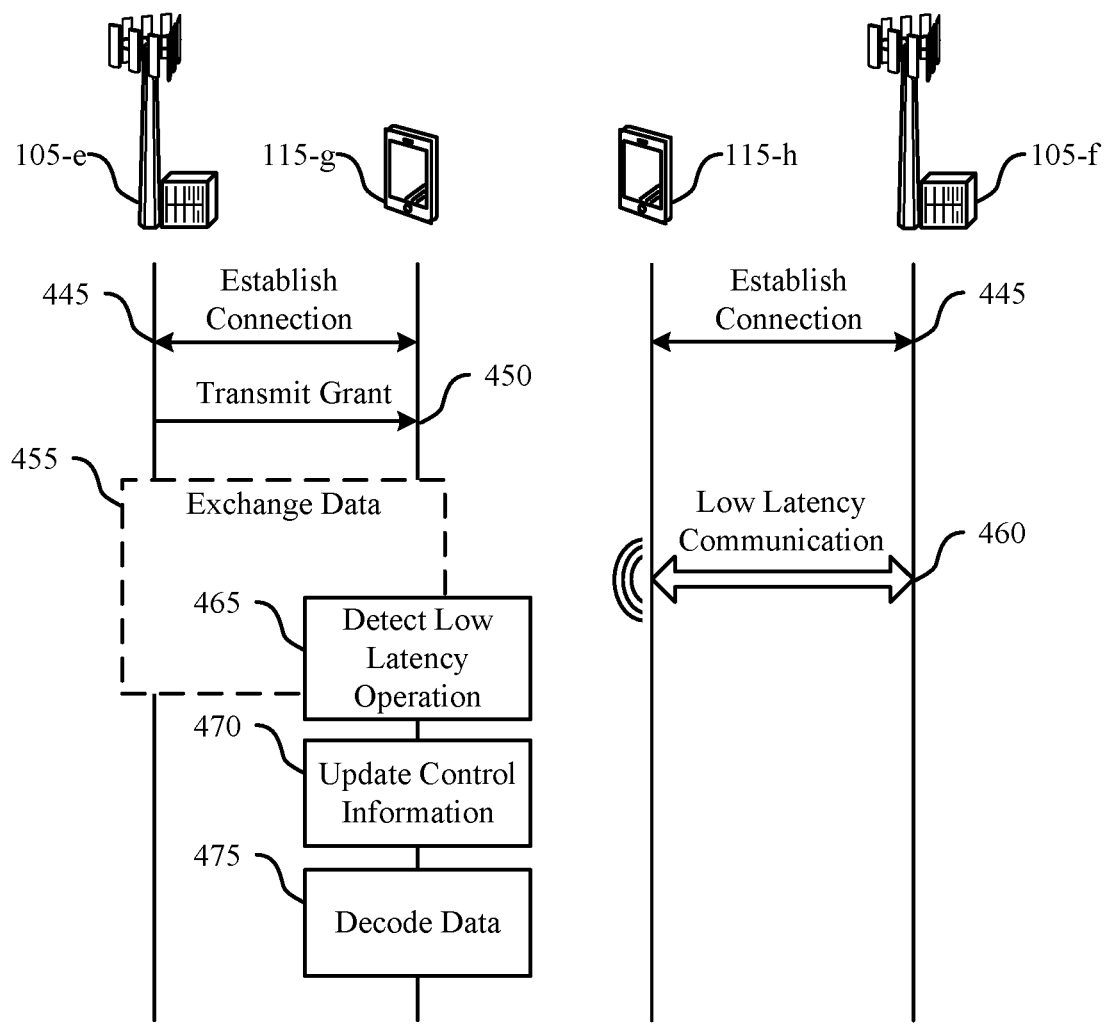

FIG. 4B illustrates an example of a process flow 400-*b* for parallel low latency awareness in accordance with various aspects of the present disclosure. Process flow 400-*b* may include UE 115-*g*, UE 115-*h*, base station 105-*e*, and base station 105-*f*, which may be examples of a UE 115 or base station 105 described with reference to FIGS. 1-2. In some examples, base station 105-*e*, base station 105-*f*, UE 115-*e*, and UE 115-*f* may utilize low latency indicators to facilitate the decoding of data.

At step 445, base station 105-*e* may establish a connection with UE 115-*g*, and base station 105-*f* may establish a connection with UE 115-*h* (not necessarily at the same time). UE 115-*h* may be located in a neighbor cell to base station 105-*e* and UE 115-*g*

At step 450, base station 105-*e* may use a control channel to transmit a grant to UE 115-*g*. The grant may include control information that may be used to decode the corresponding data. In some cases, the grant may be sent at the beginning of a first TTI. In some cases, UE 115-*g* may receive the control channel during a first symbol period of the first TTI, where the control channel includes scheduling information for the first TTI and decoding the first TTI is based on the control channel. In some cases, the first TTI may be a non-low latency TTI (e.g., a 1 ms LTE subframe).

At step 455, the base station 105-*e* and UE 115-*g* may exchange data based on the transmit grant. UE 115-*g* may receive the data channel during a first TTI utilizing resources in a data region. In some cases, The UE 115-*g* may refrain from decoding the exchanged data until a subsequent first TTI. In some examples, base station 105-*e* may transmit null tones for interference estimation. The null tones may be transmitted at pre-determined times or based on a low latency communication. In some examples the identified null tones are only present in a subset of frequency subbands used by the data channel, or a subset of time units used by the data channel.

At step 460, a low latency communication may occur between base station 105-*f* and UE 115-*h*. The low latency communication may utilize a second TTI that extends through an LTE symbol period (e.g., 71 or 83 μs). In some examples, the portion includes a frequency range that is less than a frequency range used for receiving the data channel. In some examples the portion includes a number of resource blocks (RBs). The low latency communication may use resources that overlap with or interfere with the resources being used by UE 115-*g* and base station 105-*e* to exchange data. In some cases, UE 115-*g* may be unaware of the low latency communication and the control information received in the original grant may not have taken the low latency communication into account.

At step 465, UE 115-*g* may receive an indication (either from base station 105-*e*, base station 105-*f*, or in some cases, from UE 115-*h*) and detect that low latency operation has occurred based on the indication. In some cases, UE 115-*g* may detect low latency operation has occurred by receiving a broadcast or unicast indication via base station 105-*e*. In some examples, base station 105-*e* receives the indication via a base station backhaul link. Neighboring base station 105-*f* may also send the indication via broadcast. In some cases, the indication includes a semi-static configuration.

At step 470, UE 115-*g* may update the control information received in the first grant based on the low latency indicator. In some cases, UE 115-*g* may generate a channel estimate based on the indication, and decoding the first TTI may be based on the channel estimate. In some cases, the UE 115-*g* may identify one or more null tones during the first TTI. UE 115-*g* may also generate an interference estimate based on the one or more null tones and on the indication.

At step 475, UE 115-*g* may decode the exchanged data based on the received low latency indicator and the updated control information. In some cases, base station 105-*f* or UE 115-*h* may map a set of modulation symbols of the data channel into a set of resources including the portion of the data region within the first TTI. In other cases, base station 105-*f* or UE 115-*h* may map a set of modulation symbols of the data channel into a set of resources excluding the portion of the data region within the first TTI.

Figure 5:
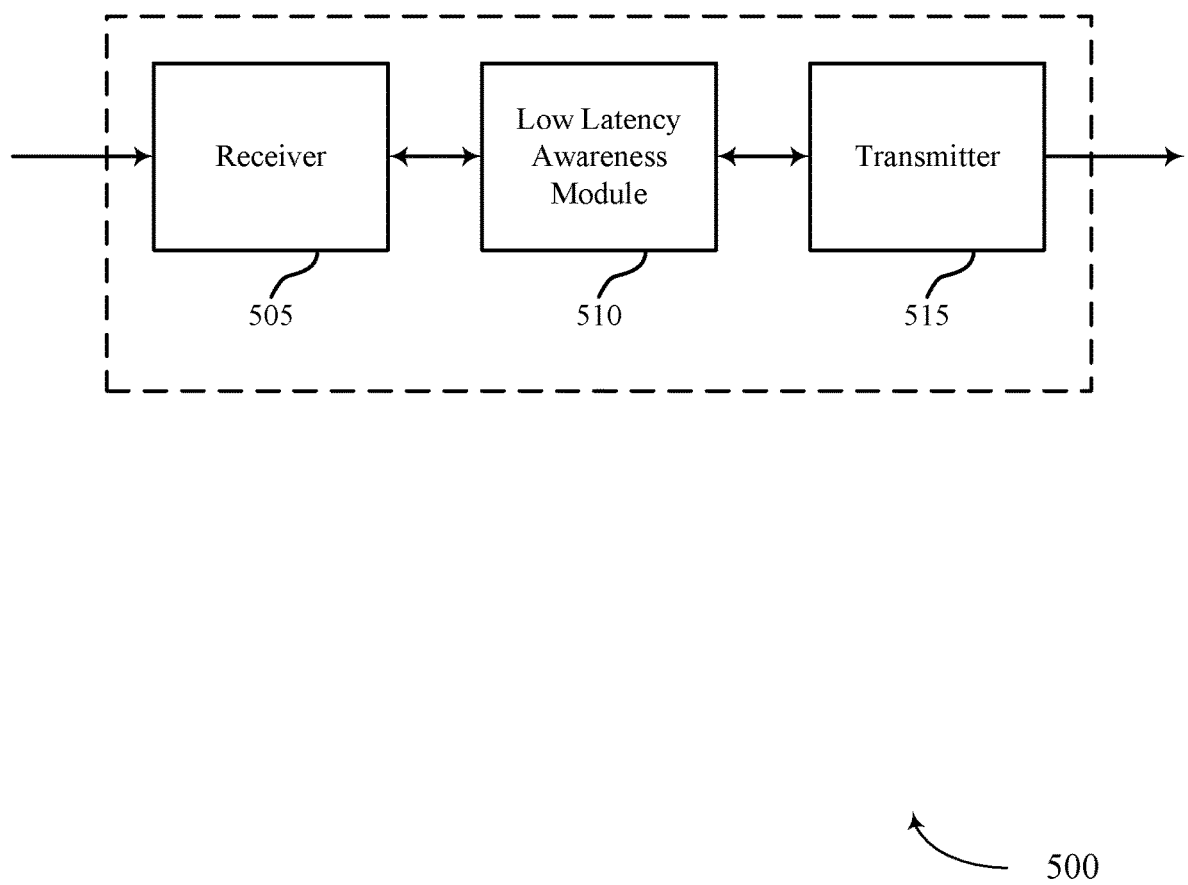
FIG. 5 shows a block diagram of a wireless device that supports parallel low latency awareness in accordance with various aspects of the present disclosure.

FIG. 5 shows a block diagram of a wireless device 500 configured for parallel low latency awareness in accordance with various aspects of the present disclosure. Wireless device 500 may be an example of aspects of a UE 115 or base station 105 described with reference to FIGS. 1-4. Wireless device 500 may include a receiver 505, a low latency awareness module 510, or a transmitter 515. Wireless device 500 may also include a processor. Each of these components may be in communication with each other.

The receiver 505 may receive information such as packets, user data, or control information associated with various information channels (e.g., control channels, data channels, and information related to parallel low latency awareness, etc.). Information may be passed on to the low latency awareness module 510, and to other components of wireless device 500. The receiver 505 may be an example of aspects of a transceiver 835 or a transceiver 935 described with reference to FIGS. 8 and 9.

The low latency awareness module 510 may receive a data channel during a first TTI utilizing resources in a data region, and it may receive an indication that a low latency transmission is present in a portion of the data region within the first TTI. In some cases, the low latency transmission is based on a second TTI, and the low latency awareness module 510 may decode the data channel based on the indication.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas. The transmitter 515 may be an example of aspects of a transceiver 835 or a transceiver 935 described with reference to FIGS. 8 and 9.

Figure 6:
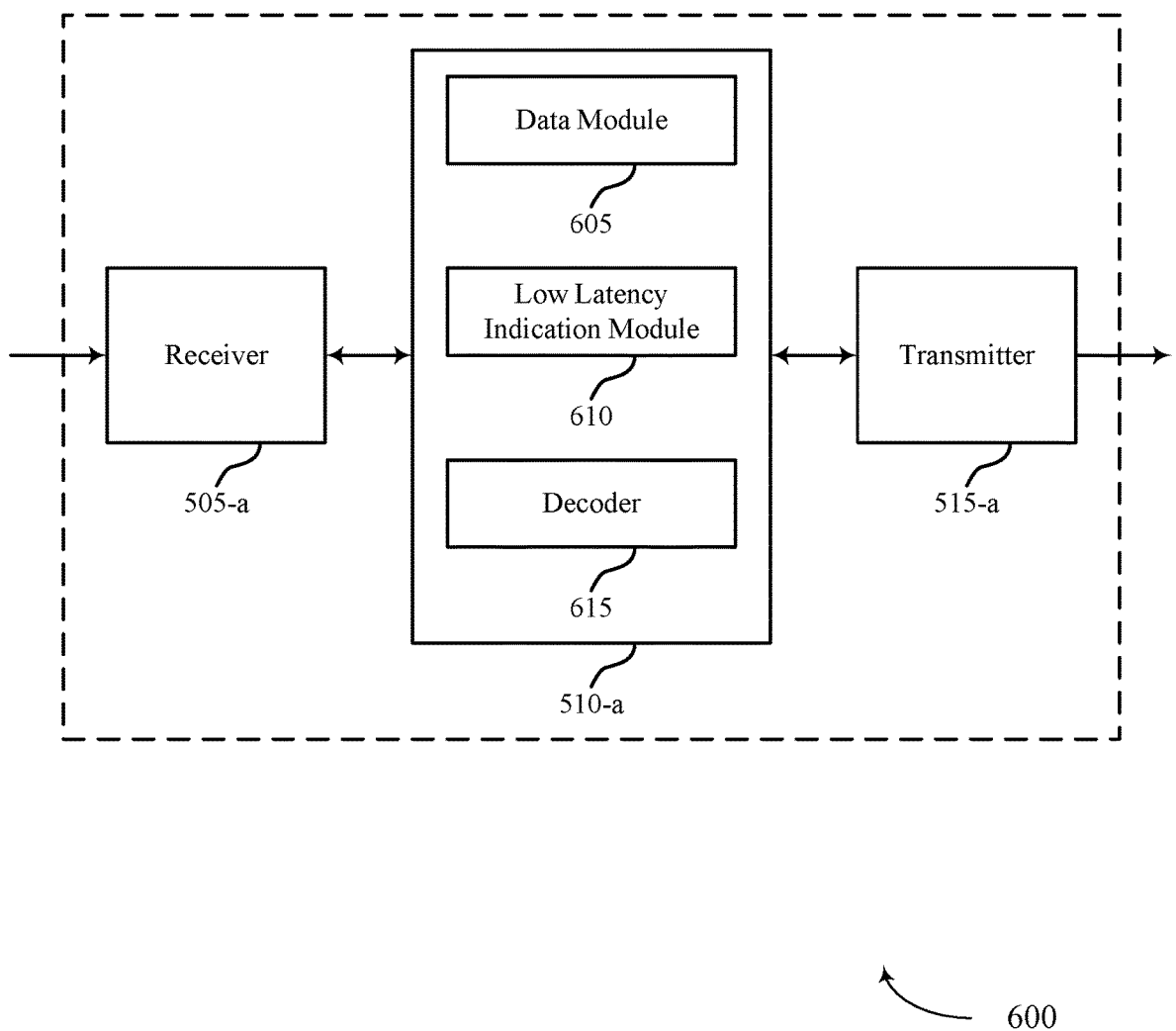
FIG. 6 shows a block diagram of a wireless device that supports parallel low latency awareness in accordance with various aspects of the present disclosure.

FIG. 6 shows a block diagram of a wireless device 600 for parallel low latency awareness in accordance with various aspects of the present disclosure. Wireless device 600 may be an example of aspects of a wireless device 500, a UE 115, or a base station 105 described with reference to FIGS. 1-5. Wireless device 600 may include a receiver 505-*a*, a low latency awareness module 510-*a*, or a transmitter 515-*a*. Wireless device 600 may also include a processor. Each of these components may be in communication with each other. The low latency awareness module 510-*a* may also include a data module 605, a low latency indication module 610, and a decoder 615.

The receiver 505-*a* may receive information which may be passed on to low latency awareness module 510-*a*, and to other components of device 600. The low latency awareness module 510-*a* may perform the operations described with reference to FIG. 5. The transmitter 515-*a* may transmit signals received from other components of wireless device 600. The receiver 505-*a* may be an example of aspects of a transceiver 835 or a transceiver 935 described with reference to FIGS. 8 and 9. The transmitter 515-*a* may be an example of aspects of a transceiver 835 or a transceiver 935 described with reference to FIGS. 8 and 9.

The data module 605 may receive a data channel during a first TTI utilizing resources in a data region as described with reference to FIGS. 2-4. In some examples, the first TTI is an LTE subframe.

The low latency indication module 610 may receive an indication that a low latency transmission is present in a portion of the data region within the first TTI, and the low latency transmission may be based on a second TTI as described with reference to FIGS. 2-4. In some examples, the indication may be received subsequent to the second TTI. In some examples, the indication may be received subsequent to the first TTI. The low latency transmission may be directed toward a different wireless device. In some examples, the low latency transmission may be from a same cell as the data channel. In some examples, the low latency transmission is from a different cell than the data channel. In some cases, the indication may be received via a base station backhaul link. The second TTI may, for example, be an LTE symbol period. In some examples, the portion has a frequency range that may be less than a frequency range used for receiving the data channel. The portion may include a number of RBs. In some examples, the indication may be received from a serving base station. In other examples, the indication may be received from a neighboring base station. The indication may be a semi-static configuration.

The decoder 615 may decode the data channel based on the indication as described with reference to FIGS. 2-4. In some examples, the decoder is part of a transceiver.

Figure 7:
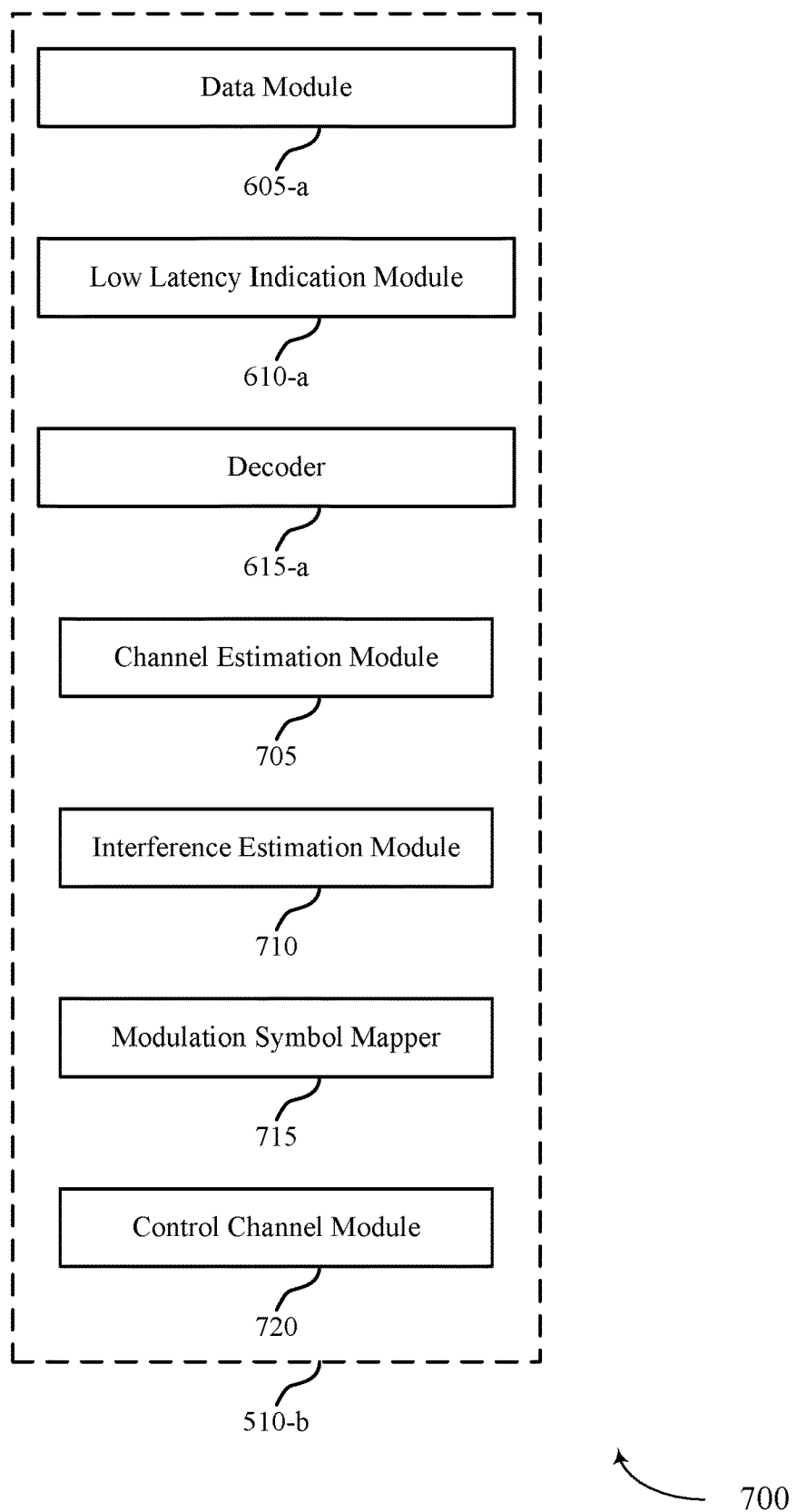
FIG. 7 shows a block diagram of a wireless device that supports parallel low latency awareness in accordance with various aspects of the present disclosure.

FIG. 7 shows a block diagram 700 of a low latency awareness module 510-*b* which may be a component of a wireless device 500 or a wireless device 600 for parallel low latency awareness in accordance with various aspects of the present disclosure. The low latency awareness module 510-*b* may be an example of aspects of a low latency awareness module 510 described with reference to FIGS. 5-6. The low latency awareness module 510-*b* may include a data module 605-*a*, a low latency indication module 610-*a*, and a decoder 615-*a*. Each of these modules may perform the functions described with reference to FIG. 6. The low latency awareness module 510-*b* may also include a channel estimation module 705, an interference estimation module 710, a modulation symbol mapper 715, and a control channel module 720.

The channel estimation module 705 may generate a channel estimate based on the indication, and decoding the first TTI is based on the channel estimate as described with reference to FIGS. 2-4.

The interference estimation module 710 may identify one or more null tones during the first TTI as described with reference to FIGS. 2-4. The interference estimation module 710 may also generate an interference estimate based on the one or more null tones and on the indication. In some examples, the identified null tones are only present in a subset of frequency subbands used by the data channel or a subset of time units used by the data channel.

The modulation symbol mapper 715 may map a set of modulation symbols of the data channel into a set of resources including the portion of the data region within the first TTI as described with reference to FIGS. 2-4. The modulation symbol mapper 715 may also map a set of modulation symbols of the data channel into a set of resources excluding the portion of the data region within the first TTI.

The control channel module 720 may receive a control channel during a first symbol period of the first TTI, and, in some examples, the control channel includes scheduling information for the first TTI, such that decoding the first TTI may be based on the control channel as described with reference to FIGS. 2-4.

The components of wireless devices 500 or 600, or the low latency awareness module 510 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 8:
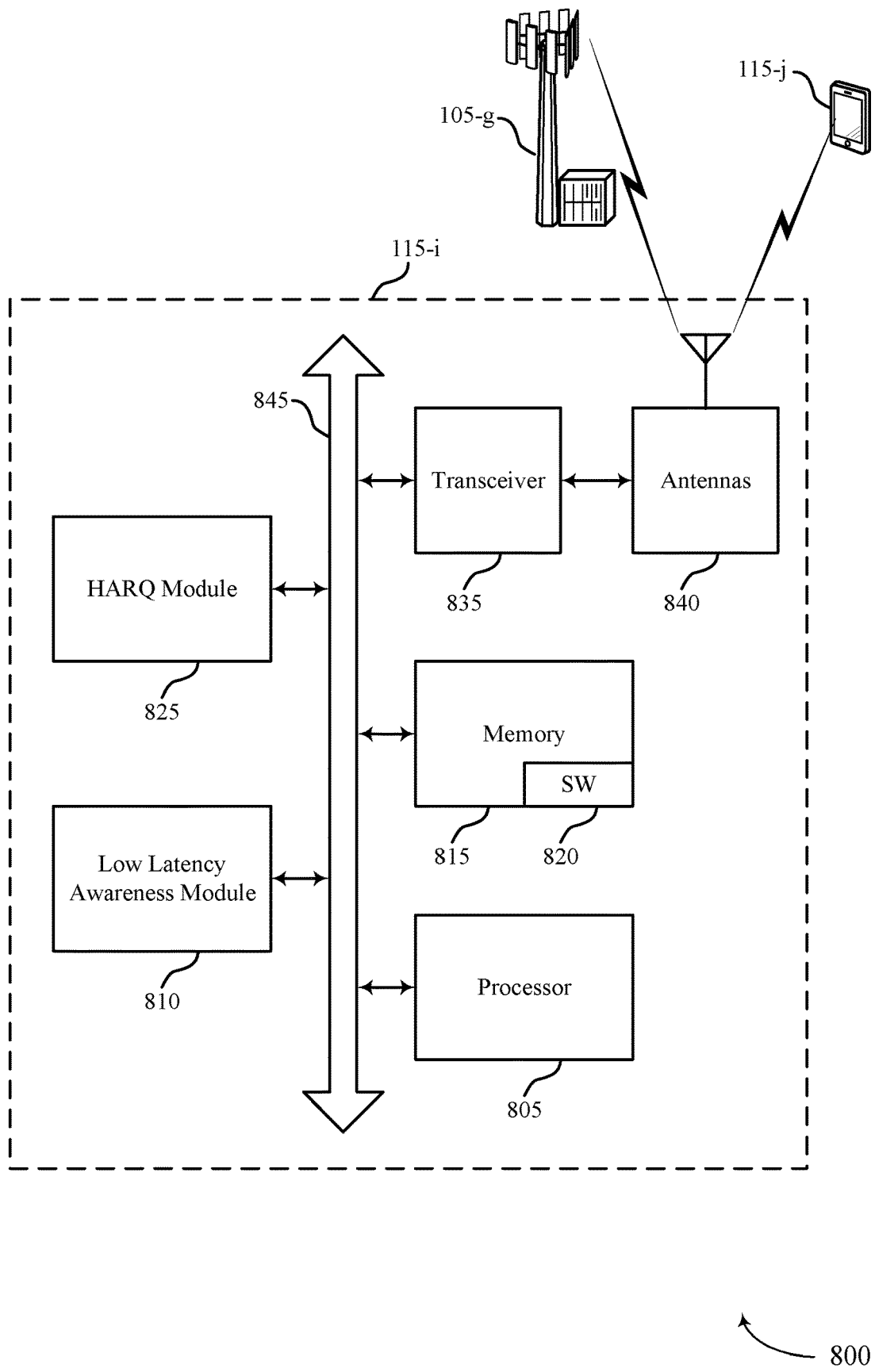
FIG. 8 illustrates a block diagram of a system including a device that supports parallel low latency awareness in accordance with various aspects of the present disclosure.

FIG. 8 shows a diagram of a system 800 configured for parallel low latency awareness in accordance with various aspects of the present disclosure. System 800 may include UE 115-*i*, which may be an example of a wireless device 500, a wireless device 600, or a UE 115 described with reference to FIGS. 1, 2 and 5-7. UE 115-*i* may include a low latency awareness module 810, which may be an example of a low latency awareness module 510 described with reference to FIGS. 5-7. UE 115-*i* may also include a HARQ module 825, which may be an example of the low latency indication module 610 described with reference to FIGS. 6-7. UE 115-*i* may also include components for bi-directional voice and data communications including components for transmitting communications and components for receiving communications. For example, UE 115-*i* may communicate bi-directionally with base station 105-*g* or UE 115-*j*.

HARQ module 825 may manage one or more HARQ processes as described above with reference to FIG. 1. In some cases, the latency of the HARQ processes may be reduced using low latency communications.

UE 115-*i* may also include a processor 805, and memory 815 (including software (SW)) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described herein. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-*i* may include a single antenna 840, UE 115-*i* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., parallel low latency awareness, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.)

Figure 9:
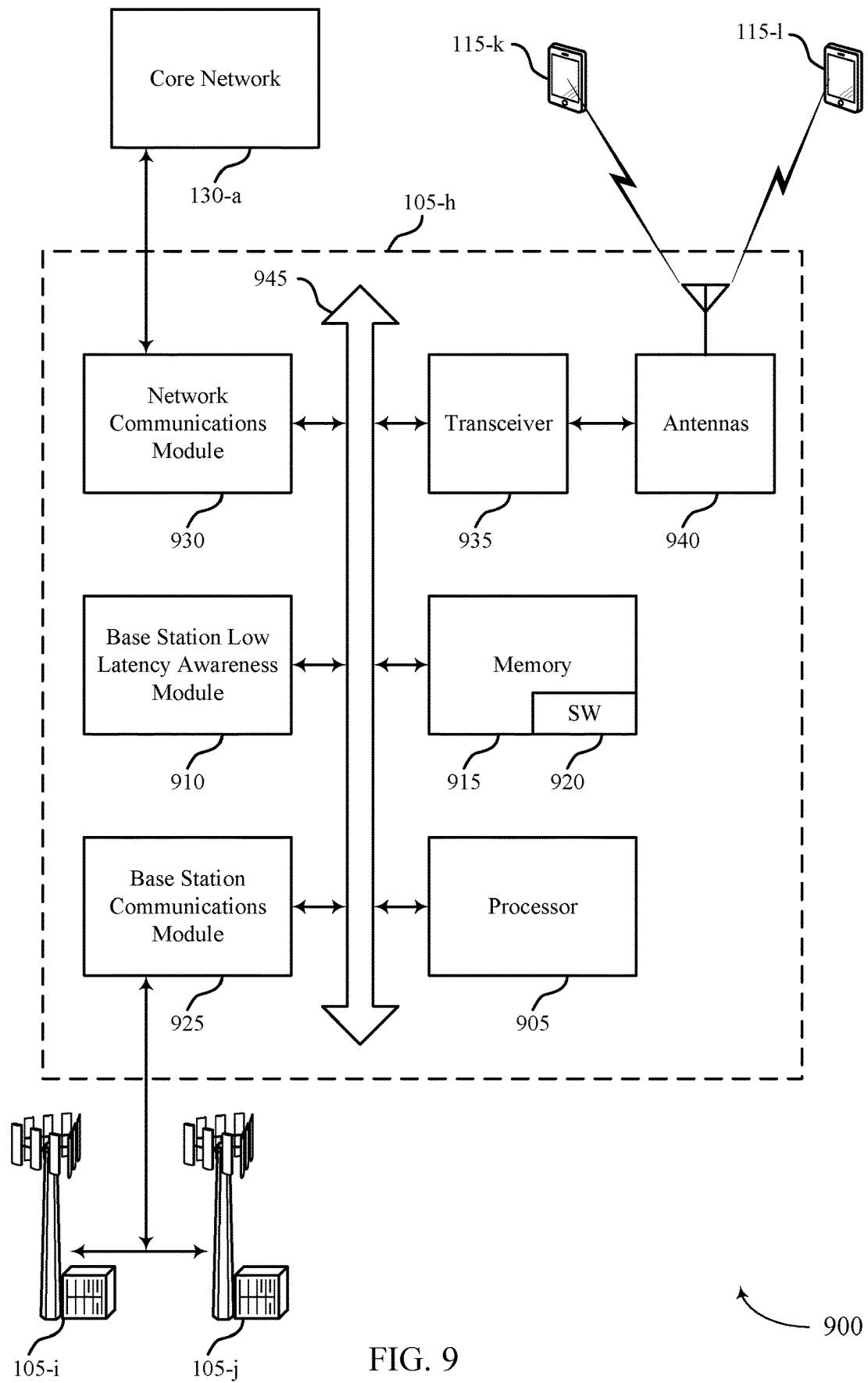
FIG. 9 illustrates a block diagram of a system including a base station that supports parallel low latency awareness in accordance with various aspects of the present disclosure.

FIG. 9 shows a diagram of a system 900 configured for parallel low latency awareness in accordance with various aspects of the present disclosure. System 900 may include base station 105-*h*, which may be an example of a wireless device 500, a wireless device 600, or a base station 105 described with reference to FIGS. 1,2, and 5-8. Base station 105-*h* may include a base station low latency awareness module 910, which may be an example of a base station low latency awareness module 910 described with reference to FIGS. 6-8. Base station 105-*h* may also include components for bi-directional voice and data communications including components for transmitting communications and components for receiving communications. For example, base station 105-*h* may communicate bi-directionally with base station 105-*i*, base station 105-*j*, UE 115-*k*, or UE 115-*l*.

In some cases, base station 105-*h* may have one or more wired backhaul links. Base station 105-*h* may have a wired backhaul link (e.g., S1 interface, etc.) to the core network 130. Base station 105-*h* may also communicate with other base stations 105, such as base station 105-*i* and base station 105-*j* via inter-base station backhaul links (e.g., an X2 interface). Each of the base stations 105 may communicate with UEs 115 using the same or different wireless communications technologies. In some cases, base station 105-*h* may communicate with other base stations such as 105-*i* or 105-*j* utilizing base station communication module 925. In some examples, base station communication module 925 may provide an X2 interface within an LTE/LTE-A wireless communication network technology to provide communication between some of the base stations 105. In some examples, base station 105-*h* may communicate with other base stations through core network 130. In some cases, base station 105-*h* may communicate with the core network 130 through network communications module 930.

The base station 105-*h* may include a processor 905, memory 915 (including software (SW) 920), transceiver 935, and antenna(s) 940, which each may be in communication, directly or indirectly, with one another (e.g., over bus system 945). The transceivers 935 may be configured to communicate bi-directionally, via the antenna(s) 940, with the UEs 115, which may be multi-mode devices. The transceiver 935 (or other components of the base station 105-*h*) may also be configured to communicate bi-directionally, via the antennas 940, with one or more other base stations (not shown). The transceiver 935 may include a modem configured to modulate the packets and provide the modulated packets to the antennas 940 for transmission, and to demodulate packets received from the antennas 940. The base station 105-*h* may include multiple transceivers 935, each with one or more associated antennas 940. The transceiver may be an example of a combined receiver 505 and transmitter 515 of FIG. 5.

The memory 915 may include RAM and ROM. The memory 915 may also store computer-readable, computer-executable software code 920 containing instructions that are configured to, when executed, cause the processor 905 to perform various functions described herein (e.g., parallel low latency awareness, selecting coverage enhancement techniques, call processing, database management, message routing, etc.). Alternatively, the software 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSPs), and the like.

The base station communication module 925 may manage communications with other base stations 105. The communications management module may include a controller or scheduler for controlling communications with UEs 115 in cooperation with other base stations 105. For example, the base station communication module 925 may coordinate scheduling for transmissions to UEs 115 for various interference mitigation techniques such as beamforming or joint transmission.

Figure 10:
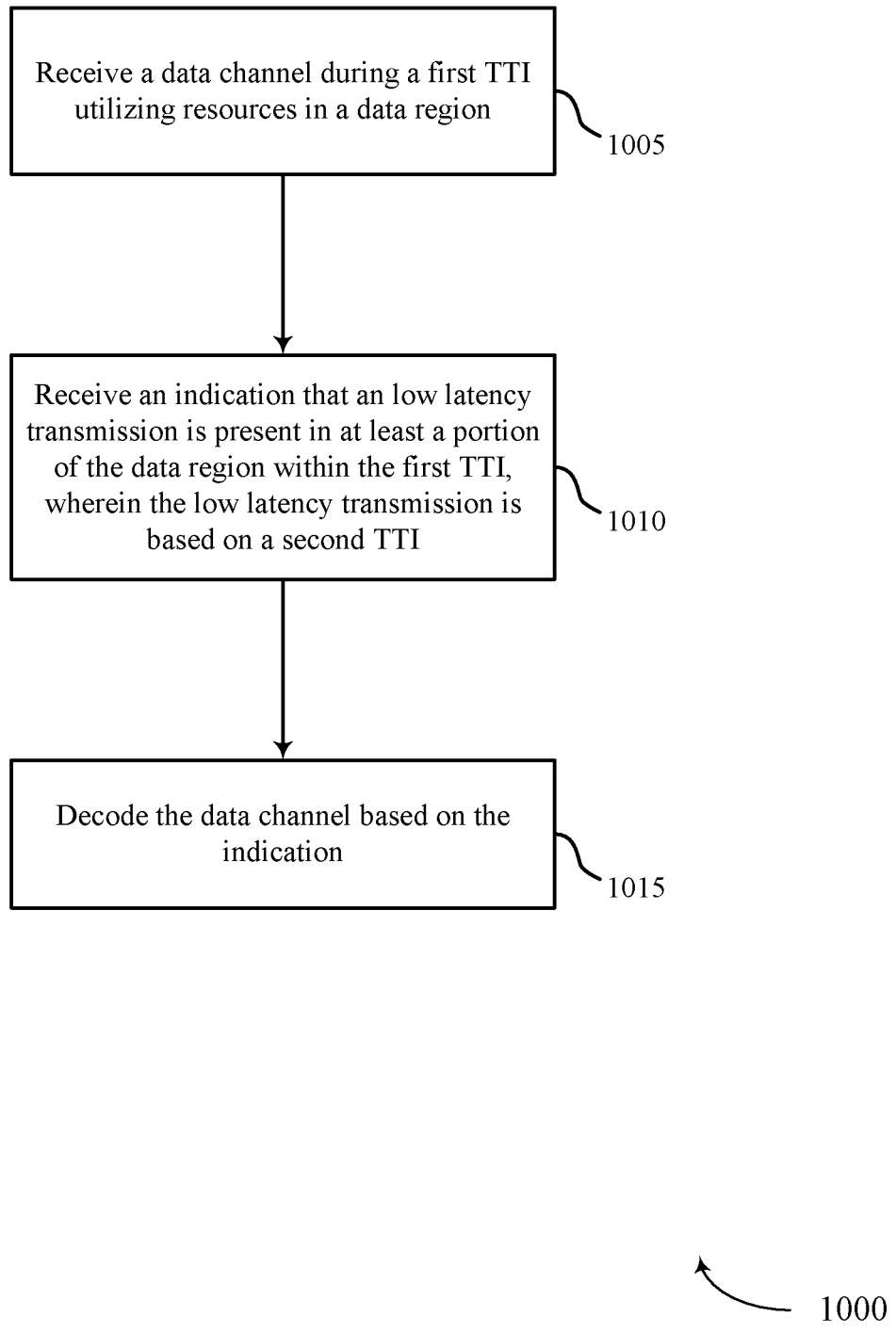
FIGS. 10 through 15 illustrate methods for parallel low latency awareness in accordance with various aspects of the present disclosure.

FIG. 10 shows a flowchart illustrating a method 1000 for parallel low latency awareness in accordance with various aspects of the present disclosure. The operations of method 1000 may be implemented by a device, such as a UE 115 or base station 105, or its components as described with reference to FIGS. 1-9. For example, the operations of method 1000 may be performed by the low latency awareness module 510 as described with reference to FIGS. 5-8. In some examples, a device may execute a set of codes to control the functional elements of the device to perform the functions described below. Additionally or alternatively, the device may perform aspects the functions described below using special-purpose hardware.

At block 1005, the device may receive a data channel during a first TTI utilizing resources in a data region as described with reference to FIGS. 2-4. In certain examples, the operations of block 1005 may be performed by the data module 605 as described with reference to FIG. 6 in conjunction with a transceiver such as illustrated by transceiver 835 or 935 described with reference to FIGS. 8 and 9.

At block 1010, the device may receive an indication that a low latency transmission is present in a portion of the data region within the first TTI, where the low latency transmission may be based on a second TTI as described with reference to FIGS. 2-4. In certain examples, the operations of block 1010 may be performed by the low latency indication module 610 as described with reference to FIG. 6 in conjunction with a transceiver such as illustrated by transceiver 835 or 935 described with reference to FIGS. 8 and 9.

At block 1015, the device may decode the data channel based on the indication as described with reference to FIGS. 2-4. In certain examples, the operations of block 1015 may be performed by the decoder 615 as described with reference to FIG. 6.

Figure 11:
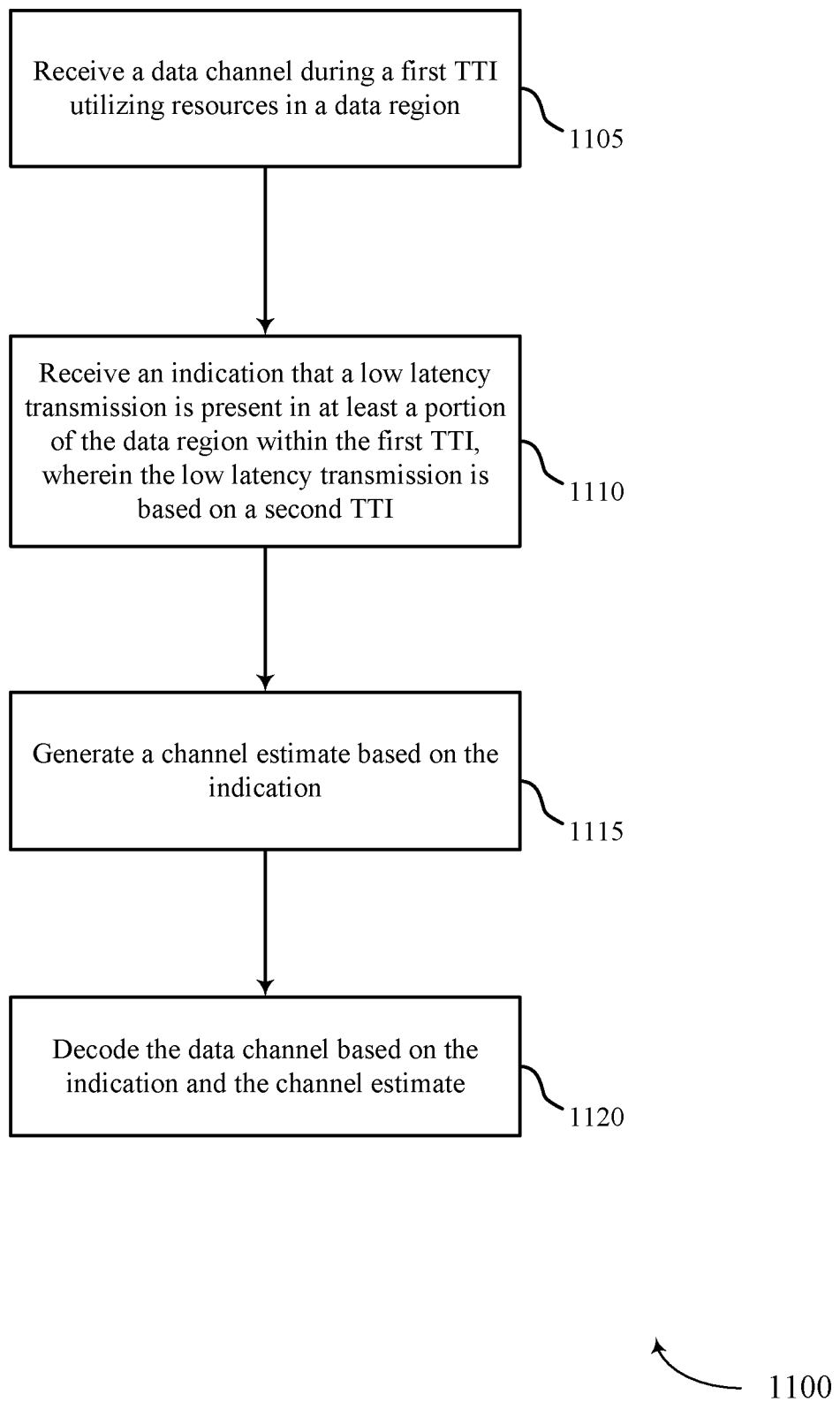

FIG. 11 shows a flowchart illustrating a method 1100 for parallel low latency awareness in accordance with various aspects of the present disclosure. The operations of method 1100 may be implemented by a device, such as a UE 115 or base station 105, or its components as described with reference to FIGS. 1-9. For example, the operations of method 1100 may be performed by the low latency awareness module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1100 may also incorporate aspects of method 1000 of FIG. 10.

At block 1105, the device may receive a data channel during a first TTI utilizing resources in a data region as described with reference to FIGS. 2-4. In certain examples, the operations of block 1105 may be performed by the data module 605 as described with reference to FIG. 6.

At block 1110, the device may receive an indication that a low latency transmission is present in a portion of the data region within the first TTI, where the low latency transmission may be based on a second TTI as described with reference to FIGS. 2-4. In certain examples, the operations of block 1110 may be performed by the low latency indication module 610 as described with reference to FIG. 6.

At block 1115, the device may generate a channel estimate based on the indication, and decoding the first TTI may be based on the channel estimate as described with reference to FIGS. 2-4. In certain examples, the operations of block 1115 may be performed by the channel estimation module 705 as described with reference to FIG. 7.

At block 1120, the device may decode the data channel based on the indication as described with reference to FIGS. 2-4. In certain examples, the operations of block 1120 may be performed by the decoder 615 as described with reference to FIG. 6.

Figure 12:
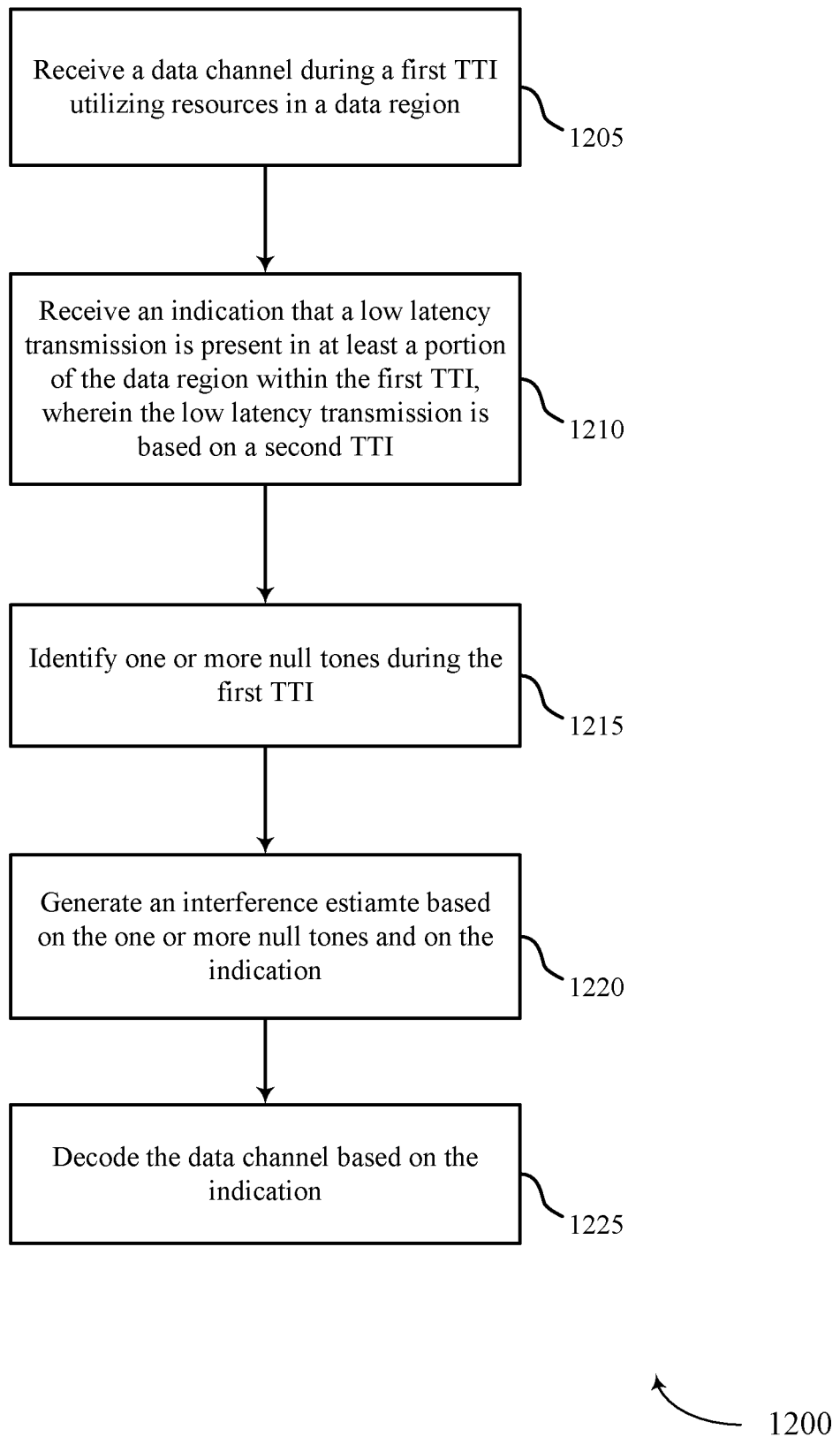

FIG. 12 shows a flowchart illustrating a method 1200 for parallel low latency awareness in accordance with various aspects of the present disclosure. The operations of method 1200 may be implemented by a device, such as a UE 115 or base station 105, or its components as described with reference to FIGS. 1-9. For example, the operations of method 1200 may be performed by the low latency awareness module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1200 may also incorporate aspects of methods 1000, and 1100 of FIGS. 10-11.

At block 1205, the device may receive a data channel during a first TTI utilizing resources in a data region as described with reference to FIGS. 2-4. In certain examples, the operations of block 1205 may be performed by the data module 605 as described with reference to FIG. 6 in conjunction with a transceiver such as illustrated by transceiver 835 or 935 described with reference to FIGS. 8 and 9.

At block 1210, the device may receive an indication that a low latency transmission is present in a portion of the data region within the first TTI, and the low latency transmission may be based on a second TTI as described with reference to FIGS. 2-4. In certain examples, the operations of block 1210 may be performed by the low latency indication module 610 as described with reference to FIG. 6 in conjunction with a transceiver such as illustrated by transceiver 835 or 935 described with reference to FIGS. 8 and 9.

At block 1215, the device may identify one or more null tones during the first TTI as described with reference to FIGS. 2-4. In certain examples, the operations of block 1215 may be performed by the interference estimation module 710 as described with reference to FIG. 7.

At block 1220, the device may generate an interference estimate based on the one or more null tones and on the indication as described with reference to FIGS. 2-4. In certain examples, the operations of block 1220 may be performed by the interference estimation module 710 as described with reference to FIG. 7.

At block 1225, the device may decode the data channel based on the indication as described with reference to FIGS. 2-4. In certain examples, the operations of block 1225 may be performed by the decoder 615 as described with reference to FIG. 6.

Figure 13:
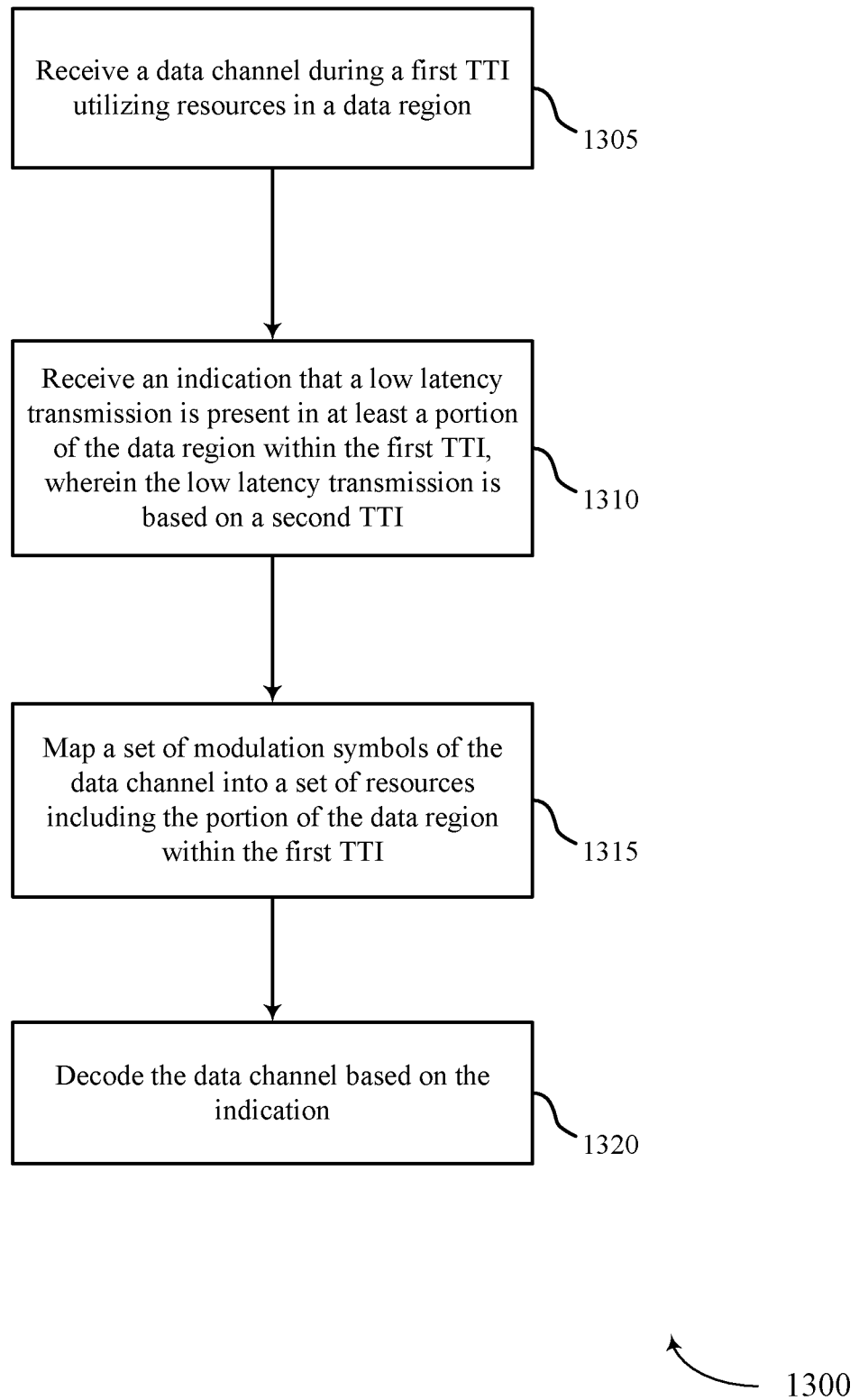

FIG. 13 shows a flowchart illustrating a method 1300 for parallel low latency awareness in accordance with various aspects of the present disclosure. The operations of method 1300 may be implemented by a device, such as a UE 115 or base station 105, or its components as described with reference to FIGS. 1-9. For example, the operations of method 1300 may be performed by the low latency awareness module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1300 may also incorporate aspects of methods 1000, 1100, and 1200 of FIGS. 10-12.

At block 1305, the device may receive a data channel during a first TTI utilizing resources in a data region as described with reference to FIGS. 2-4. In certain examples, the operations of block 1305 may be performed by the data module 605 as described with reference to FIG. 6 in conjunction with a transceiver such as illustrated by transceiver 835 or 935 described with reference to FIGS. 8 and 9.

At block 1310, the device may receive an indication that a low latency transmission is present in a portion of the data region within the first TTI, and the low latency transmission may be based on a second TTI as described with reference to FIGS. 2-4. In certain examples, the operations of block 1310 may be performed by the low latency indication module 610 as described with reference to FIG. 6.

At block 1315, the device may map a set of modulation symbols of the data channel into a set of resources including the portion of the data region within the first TTI as described with reference to FIGS. 2-4. In certain examples, the operations of block 1315 may be performed by the modulation symbol mapper 715 as described with reference to FIG. 7.

At block 1320, the device may decode the data channel based on the indication as described with reference to FIGS.

2-4. In certain examples, the operations of block 1320 may be performed by the decoder 615 as described with reference to FIG. 6.

Figure 14:
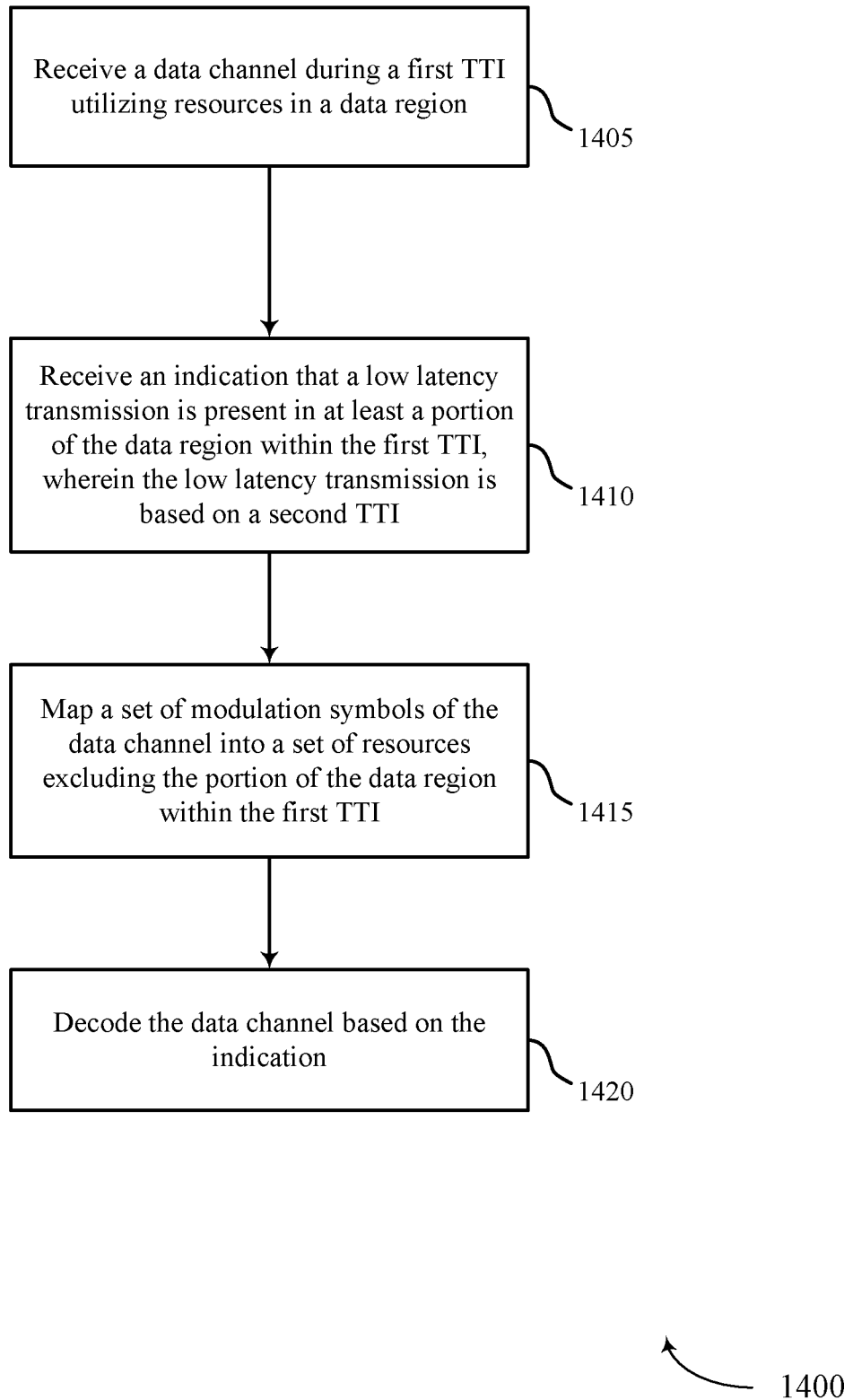

FIG. 14 shows a flowchart illustrating a method 1400 for parallel low latency awareness in accordance with various aspects of the present disclosure. The operations of method 1400 may be implemented by a device, such as a UE 115 or base station 105, or its components as described with reference to FIGS. 1-9. For example, the operations of method 1400 may be performed by the low latency awareness module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1400 may also incorporate aspects of methods 1000, 1100, 1200, and 1300 of FIGS. 10-13.

At block 1405, the device may receive a data channel during a first TTI utilizing resources in a data region as described with reference to FIGS. 2-4. In certain examples, the operations of block 1405 may be performed by the data module 605 as described with reference to FIG. 6 in conjunction with a transceiver such as illustrated by transceiver 835 or 935 described with reference to FIGS. 8 and 9.

At block 1410, the device may receive an indication that a low latency transmission is present in a portion of the data region within the first TTI, and the low latency transmission may be based on a second TTI as described with reference to FIGS. 2-4. In certain examples, the operations of block 1410 may be performed by the low latency indication module 610 as described with reference to FIG. 6 in conjunction with a transceiver such as illustrated by transceiver 835 or 935 described with reference to FIGS. 8 and 9.

At block 1415, the device may map a set of modulation symbols of the data channel into a set of resources excluding the portion of the data region within the first TTI as described with reference to FIGS. 2-4. In certain examples, the operations of block 1415 may be performed by the modulation symbol mapper 715 as described with reference to FIG. 7.

At block 1420, the device may decode the data channel based on the indication as described with reference to FIGS. 2-4. In certain examples, the operations of block 1420 may be performed by the decoder 615 as described with reference to FIG. 6.

Figure 15:
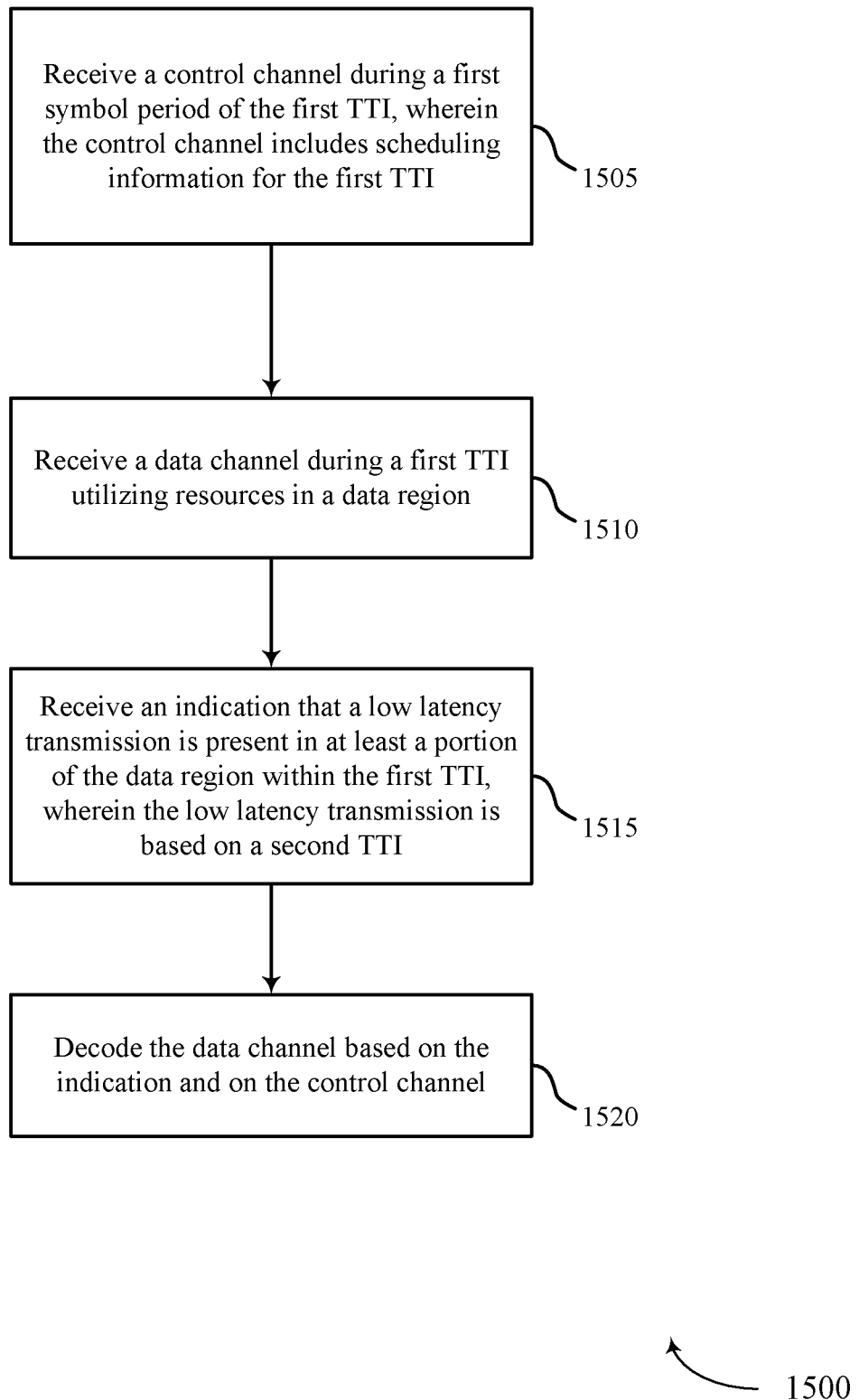

FIG. 15 shows a flowchart illustrating a method 1500 for parallel low latency awareness in accordance with various aspects of the present disclosure. The operations of method 1500 may be implemented by a device, such as a UE 115 or base station 105, or its components as described with reference to FIGS. 1-9. For example, the operations of method 1500 may be performed by the low latency awareness module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1500 may also incorporate aspects of methods 1000, 1100, 1200, 1300, and 1400 of FIGS. 10-14.

At block 1505, the device may receive a control channel during a first symbol period of the first TTI, and the control channel may include scheduling information for the first TTI and decoding the first TTI is based on the control channel as described with reference to FIGS. 2-4. In certain examples, the operations of block 1505 may be performed by the control channel module 720 as described with reference to FIG. 7 in conjunction with a transceiver such as illustrated by transceiver 835 or 935 described with reference to FIGS. 8 and 9.

At block 1510, the device may receive a data channel during a first TTI utilizing resources in a data region as described with reference to FIGS. 2-4. In some cases, the indication is received subsequent to the second TTI. In certain examples, the operations of block 1510 may be performed by the data module 605 as described with reference to FIG. 6 in conjunction with a transceiver such as illustrated by transceiver 835 or 935 described with reference to FIGS. 8 and 9.

At block 1515, the device may receive an indication that a low latency transmission is present in a portion of the data region within the first TTI, and the low latency transmission may be based on a second TTI as described with reference to FIGS. 2-4. In certain examples, the operations of block 1515 may be performed by the low latency indication module 610 as described with reference to FIG. 6 in conjunction with a transceiver such as illustrated by transceiver 835 or 935 described with reference to FIGS. 8 and 9.

At block 1520, the device may decode the data channel based on the indication as described with reference to FIGS. 2-4. In some cases, the indication is received subsequent to the second TTI. In certain examples, the operations of block 1520 may be performed by the decoder 615 as described with reference to FIG. 6.

Thus, methods 1000, 1100, 1200, 1300, 1400, and 1500 may provide for parallel low latency awareness. It should be noted that methods 1000, 1100, 1200, 1300, 1400, and 1500 describe possible implementation, and that the operations and the steps may be rearranged or otherwise modified such that other implementations are possible. In some examples, aspects from two or more of the methods 1000, 1100, 1200, 1300, 1400, and 1500 may be combined.

The detailed description set forth above in connection with the appended drawings describes exemplary configurations and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1 X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method for wireless communications at a user equipment (UE), comprising:
   receiving, within a first control region of a first transmission time interval (TTI), control information for a non-low latency communication from a base station, the non-low latency communication associated with a downlink transmission in a first data region of the first TTI;
   receiving, within a second control region subsequent to the first control region, a low latency indicator from the base station, the low latency indicator associated with a low latency communication in the first data region of the first TTI; and
   determining a set of resources associated with the low latency communication that at least partially overlap resources of the downlink transmission based at least in part on the low latency indicator.

2. The method of claim 1, wherein the low latency indicator indicates a set of symbols allocated for the low latency communication.

3. The method of claim 2, further comprising:
receiving, within a third control region subsequent to the second control region, a second low latency indicator associated with a second low latency communication from the base station, the second low latency indicator indicating a second set of symbols occurring before the third control region allocated for the second low latency communication.

4. The method of claim 3, wherein the second set of symbols comprises one or more symbols of the set of symbols.

5. The method of claim 3, wherein the second set of symbols comprises symbols only between the second control region and the third control region.

6. The method of claim 2, wherein the low latency indicator comprises a bitmap corresponding to the set of symbols allocated for the low latency communication.

7. The method of claim 1, further comprising:
decoding at least a portion of the downlink transmission in the first data region of the first TTI based at least in part on the set of resources associated with the low latency communication.

8. The method of claim 1, further comprising:
refraining from decoding at least a portion of the downlink transmission in the first data region of the first TTI based at least in part on the set of resources associated with the low latency communication.

9. The method of claim 8, wherein refraining from decoding comprises:
refraining from decoding all symbols of the downlink transmission in the first TTI that overlap or are subsequent to a symbol allocated for the low latency communication.

10. The method of claim 1, wherein receiving the low latency indicator comprises:
receiving the low latency indicator via a symbol associated with broadcast or multi-cast content.

11. The method of claim 1, wherein receiving the low latency indicator comprises:
receiving the low latency indicator aligned with a boundary of a code block associated with unicast content for the UE.

12. The method of claim 11, further comprising:
decoding the code block based at least in part on the low latency indicator.

13. An apparatus for wireless communications at a user equipment (UE), comprising:
a processor,
memory in electronic communication with the processor; and
instructions stored in the memory and executable by the processor to cause the apparatus to:
receive, within a first control region of a first transmission time interval (TTI), control information for a non-low latency communication from a base station, the non-low latency communication associated with a downlink transmission in a first data region of the first TTI;
receive, within a second control region subsequent to the first control region, a low latency indicator from the base station, the low latency indicator associated with a low latency communication in the first data region of the first TTI; and
determine a set of resources associated with the low latency communication that at least partially overlap resources of the downlink transmission based at least in part on the low latency indicator.

14. The apparatus of claim 13, wherein the low latency indicator indicates a set of symbols allocated for the low latency communication.

15. The apparatus of claim 14, wherein the instructions are further executable by the processor to cause the apparatus to:
receive, within a third control region subsequent to the second control region, a second low latency indicator associated with a second low latency communication from the base station, the second low latency indicator indicating a second set of symbols occurring before the third control region allocated for the second low latency communication.

16. The apparatus of claim 15, wherein the second set of symbols comprises one or more symbols of the set of symbols.

17. The apparatus of claim 15, wherein the second set of symbols comprises symbols only between the second control region and the third control region.

18. The apparatus of claim 14, wherein the low latency indicator comprises a bitmap corresponding to the set of symbols allocated for the low latency communication.

19. The apparatus of claim 13, wherein the instructions are further executable by the processor to cause the apparatus to:
decode at least a portion of the downlink transmission in the first data region of the first TTI based at least in part on the set of resources associated with the low latency communication.

20. The apparatus of claim 13, wherein the instructions are further executable by the processor to cause the apparatus to:
refrain from decoding at least a portion of the downlink transmission in the first data region of the first TTI based at least in part on the set of resources associated with the low latency communication.

21. The apparatus of claim 20, wherein the instructions to refrain from decoding are executable by the processor to cause the apparatus to:
refrain from decoding all symbols of the downlink transmission in the first TTI that overlap or are subsequent to a symbol allocated for the low latency communication.

22. The apparatus of claim 13, wherein the instructions to receive the low latency indicator are executable by the processor to cause the apparatus to:
receive the low latency indicator via a symbol associated with broadcast or multi-cast content.

23. The apparatus of claim 13, wherein the instructions to receive the low latency indicator are executable by the processor to cause the apparatus to:
receive the low latency indicator aligned with a boundary of a code block associated with unicast content for the UE.

24. The apparatus of claim 23, wherein the instructions are further executable by the processor to cause the apparatus to:
decode the code block based at least in part on the low latency indicator.

25. An apparatus for wireless communications at a user equipment (UE), comprising:
means for receiving, within a first control region of a first transmission time interval (TTI), control information for a non-low latency communication from a base station, the non-low latency communication associated with a downlink transmission in a first data region of the first TTI;

means for receiving, within a second control region subsequent to the first control region, a low latency indicator from the base station, the low latency indicator associated with a low latency communication in the first data region of the first TTI; and means for determining a set of resources associated with the low latency communication that at least partially overlap resources of the downlink transmission based at least in part on the low latency indicator.

26. The apparatus of claim 25, wherein the low latency indicator indicates a set of symbols allocated for the low latency communication.

27. The apparatus of claim 26, further comprising:
means for receiving, within a third control region subsequent to the second control region, a second low latency indicator associated with a second low latency communication from the base station, the second low latency indicator indicating a second set of symbols occurring before the third control region allocated for the second low latency communication.

28. A non-transitory computer-readable medium storing code for wireless communications at a user equipment (UE), the code comprising instructions executable by a processor to:

receive, within a first control region of a first transmission time interval (TTI), control information for a non-low latency communication from a base station, the non-low latency communication associated with a downlink transmission in a first data region of the first TTI;

receive, within a second control region subsequent to the first control region, a low latency indicator from the base station, the low latency indicator associated with a low latency communication in the first data region of the first TTI; and determine a set of resources associated with the low latency communication that at least partially overlap resources of the downlink transmission based at least in part on the low latency indicator.

29. The non-transitory computer-readable medium of claim 28, wherein the low latency indicator indicates a set of symbols allocated for the low latency communication.

30. The non-transitory computer-readable medium of claim 29, wherein the instructions are further executable to:
receive, within a third control region subsequent to the second control region, a second low latency indicator associated with a second low latency communication from the base station, the second low latency indicator indicating a second set of symbols occurring before the third control region allocated for the second low latency communication.

* * * * *